(12) United States Patent
Higuchi et al.

(10) Patent No.: US 11,178,219 B2
(45) Date of Patent: Nov. 16, 2021

(54) RESOURCE ASSURANCE FOR VEHICLE CLOUDIFICATION

(71) Applicant: TOYOTA JIDOSHA KABUSHIKI KAISHA, Toyota (JP)

(72) Inventors: Takamasa Higuchi, Mountain View, CA (US); Onur Altintas, Mountain View, CA (US); Toru Nakanishi, Nagakute (JP)

( * ) Notice: Subject to any disclaimer, the term of this patent is extended or adjusted under 35 U.S.C. 154(b) by 164 days.

(21) Appl. No.: 16/297,251

(22) Filed: Mar. 8, 2019

(65) Prior Publication Data

US 2020/0287960 A1 Sep. 10, 2020

(51) Int. Cl.
H04L 29/08 (2006.01)
H04W 72/04 (2009.01)
H04W 4/40 (2018.01)

(52) U.S. Cl.
CPC .......... H04L 67/1002 (2013.01); H04W 4/40 (2018.02); H04W 72/0413 (2013.01)

(58) Field of Classification Search
CPC ..................................................... H04W 4/40
See application file for complete search history.

(56) References Cited

U.S. PATENT DOCUMENTS

| | | | |
|---|---|---|---|
| 10,405,215 B2* | 9/2019 | Tavares Coutinho | H04L 67/18 |
| 10,455,370 B2* | 10/2019 | Park et al. | H04W 4/06 |
| 10,536,949 B2* | 1/2020 | Sheng | H04W 76/14 |
| 10,686,558 B1* | 6/2020 | Kodaypak | H04W 4/06 |
| 10,687,175 B2* | 6/2020 | Kim | H04W 4/40 |
| 10,691,138 B2* | 6/2020 | Antunes Marques Esteves | H04L 67/12 |
| 10,705,884 B2* | 7/2020 | Altintas | G06F 9/5016 |
| 10,716,134 B2* | 7/2020 | Gulati | H04W 72/14 |
| 10,769,031 B2* | 9/2020 | Higuchi | H04W 4/44 |
| 10,772,016 B2* | 9/2020 | Chen | H04L 43/00 |
| 10,798,723 B2* | 10/2020 | Hong | H04W 72/042 |
| 10,834,642 B2* | 11/2020 | Baghel | H04W 72/005 |
| 10,952,111 B2* | 3/2021 | Kahtava et al. | H04W 36/06 |
| 2018/0242385 A1* | 8/2018 | Chandramouli | G08G 1/096775 |
| 2019/0037555 A1* | 1/2019 | Kim et al. | H04W 72/0413 |
| 2019/0053000 A1* | 2/2019 | Filippou | G06F 8/76 |
| 2019/0068434 A1* | 2/2019 | Moreira da Mota | H04L 43/08 |
| 2019/0171208 A1* | 6/2019 | Magalhaes de Matos | G05D 1/0022 |

(Continued)

Primary Examiner — Gregory B Sefcheck
(74) Attorney, Agent, or Firm — Burbage Law, P.C.; Jon-Michael Burbage; Elizabeth Ruzich

(57) ABSTRACT

The disclosure includes embodiments for ensuring a satisfaction of a resource demand in a vehicular micro cloud. In some embodiments, a method for a connected vehicle that is a member of the vehicular micro cloud that includes multiple connected vehicles that share their computing resources and computing services with one another, includes: modifying an operation of a communication unit of the connected vehicle to receive a notification message from a communication server; determining that an allocation function included in the notification message meets an expectation of the connected vehicle, where the allocation function is configured to satisfy the resource demand of the vehicular micro cloud while limiting a total allocation distributed by the communication server; and responsive to the allocation function meeting the expectation, provisioning a resource requested by the notification message to the vehicular micro cloud for use by any member of the vehicular micro cloud.

20 Claims, 16 Drawing Sheets

(56) References Cited

U.S. PATENT DOCUMENTS

| | | | |
|---|---|---|---|
| 2019/0246385 A1* | 8/2019 | Lin | H04L 43/0876 |
| 2019/0289610 A1* | 9/2019 | Ju | H04L 65/1036 |
| 2020/0128470 A1* | 4/2020 | Mok | H04W 40/14 |
| 2020/0128591 A1* | 4/2020 | Subramanian | H04L 5/0037 |
| 2020/0178137 A1* | 6/2020 | Hassan Hussein et al. | H04W 36/08 |
| 2020/0226921 A1* | 7/2020 | Higuchi | H04W 4/40 |
| 2020/0257298 A1* | 8/2020 | Ucar | G06F 30/20 |
| 2020/0288432 A1* | 9/2020 | Min | H04W 24/10 |

* cited by examiner

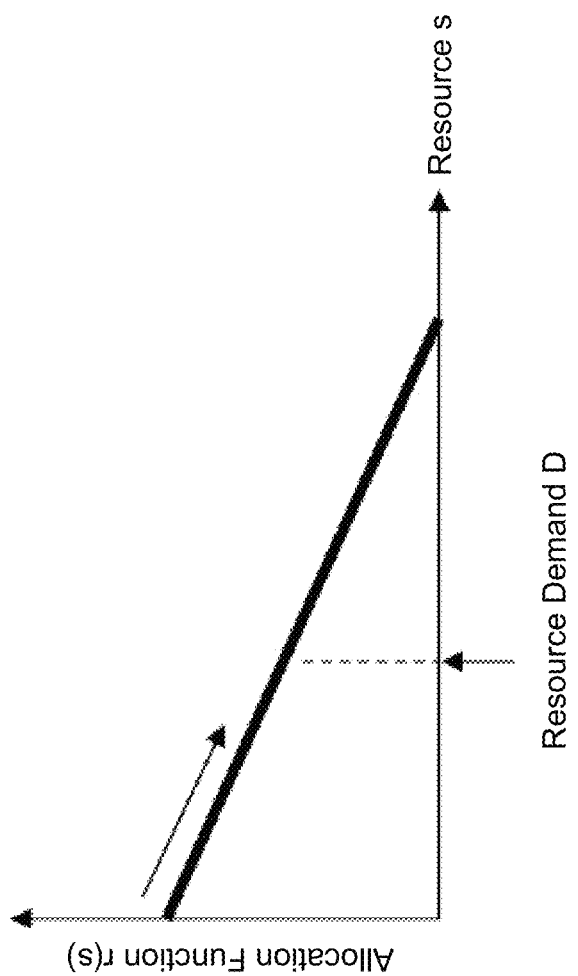

RESOURCE ASSURANCE FOR VEHICLE CLOUDIFICATION

BACKGROUND

The specification relates to ensuring a satisfaction of a resource need or a resource demand in a vehicular micro cloud so that requests for cloudification services are fulfilled within the vehicular micro cloud.

In the future, vehicles are expected to exchange an increasing amount of data content with remote cloud servers (e.g., by way of cellular networks). Examples of such data content include one or more of the following: three-dimensional road maps for automated driving; content for infotainment services; etc. An increasing amount of network traffic between the vehicles and cloud servers may cause a significant load on radio access networks and underlying backbone networks. Cloud computing aids are needed to assist connected vehicles to exchange this data with the cloud servers.

SUMMARY

Distributed data storage and distributed computing by a cluster of connected vehicles (i.e., a "vehicular micro cloud") is a promising solution to cope with the increasing network traffic generated for and by connected vehicles. As vehicular micro clouds, vehicles: collaboratively store (or cache) data content in their onboard data storage devices; collaboratively share data content over vehicle-to-vehicle (V2V) networks as requested by other vehicles; collaboratively compute the solutions to problems; collaboratively execute computer programs; and collaboratively provide computing services to one another or a group of vehicles.

Multiple vehicular micro clouds can be interconnected over V2V networks to form a wide-scale vehicular macro cloud. In the vehicular macro cloud, vehicles can request data contents and task execution from other vehicles or vehicular micro clouds of the vehicular macro cloud by accessing the other vehicles or vehicular micro clouds over V2V networks.

Described are embodiments of a resource manager installed in a variety of connected endpoints located in a roadway environment. The connected endpoints may include connected vehicles or any other processor-based connected endpoints such as a roadside unit, an edge server and a cloud server, etc.

In some embodiments, the resource manager is installed in onboard units of a plurality of connected vehicles. The plurality of connected vehicles is organized into vehicular micro clouds or vehicular macro clouds ("vehicular clouds"). In this way, the connected vehicles share their computing resources with one another (e.g., their computational abilities, storage abilities, etc.) to provide cloudification services to different connected vehicles. Vehicles that are included in these vehicular clouds are referred to as "members."

Vehicular clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

Generally described, the resource manager operates in a distributed manner across multiple vehicles to form a communication server. The communication server is operable to provide the following example functionality: determining a resource need of a vehicular cloud; notifying members of the resource need of the vehicular cloud; and taking actions to ensure that the members allocate sufficient resources (e.g., computing resources) to meet the resource need of the vehicular cloud.

An example advantage and improvement provided by the resource manager described herein over existing solutions include that the resource manager beneficially provides a solution to ensure that vehicles reserve enough of their resources for use by other members of the vehicular cloud(s) so that requests for cloudification services can be fulfilled within the vehicular cloud(s).

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a connected vehicle that is a member of a vehicular micro cloud that includes a set of connected vehicles that share their computing resources and computing services with one another, including: modifying an operation of a communication unit of the connected vehicle to receive a notification message from a communication server via a Vehicle-to-Everything (V2X) communication; determining that an allocation function included in the notification message meets an expectation of the connected vehicle, where the allocation function is configured to satisfy a resource demand of the vehicular micro cloud while limiting a total allocation distributed by the communication server; and responsive to the allocation function meeting the expectation of the connected vehicle, provisioning a resource requested by the notification message to the vehicular micro cloud for use by any member of the vehicular micro cloud. Other embodiments of this aspect include corresponding computer systems, apparatus, and computer programs recorded on one or more computer storage devices, each configured to perform the actions of the methods.

Implementations may include one or more of the following features. The method where the allocation function describes a function that specifies a total amount of the resource supplied in the vehicular micro cloud during a target time period. In some embodiments, the allocation function describes a function of the total amount of the resource supplied in the vehicular micro cloud during the target time period. In some embodiments, the allocation function is operable to control the total amount of the resource supplied in the vehicular micro cloud during the target time period. The method where: responsive to determining that the total amount of the resource supplied in the vehicular micro cloud does not exceed the resource demand of the vehicular micro cloud, the allocation function is an increasing function that specifies the total amount of the resource supplied in the vehicular micro cloud so that the resource demand of the vehicular micro cloud is met by causing host vehicles to provision the resource to the vehicular micro cloud; and responsive to determining that the total amount of the resource supplied in the vehicular micro cloud exceeds the resource demand, the allocation function is a decreasing function that specifies the total amount of the resource supplied in the vehicular micro cloud so that the total allocation distributed by the communication server is limited. The method where the allocation function is a non-increasing function of the total amount of the resource supplied in the vehicular micro cloud. The method where modifying the operation of the communication unit of the connected vehicle to receive the notification message from the communication server via the V2X communication includes: modifying an operation element of the communication unit to receive the notification message from the communication server via the V2X communication, where the notification message includes one or more of the following: a description of the resource to be requested; a target time period when the resource is requested; the allocation function; and a deadline to claim an allocation from the communication server. The method where determining that the allocation function included in the notification message meets the expectation of the connected vehicle includes: determining a suggested allocation based on the allocation function; determining an expected allocation of the connected vehicle for provisioning the resource to the vehicular micro cloud; and responsive to the suggested allocation satisfying the expected allocation, determining that the allocation function included in the notification message meets the expectation of the connected vehicle. The method where the expected allocation of the connected vehicle is determined based on one or more expectation-determination factors, including one or more of the following: a remaining amount of the resource in an onboard computer unit of the connected vehicle; energy consumption for provisioning the resource to the vehicular micro cloud; and a hardware cost of the onboard computer unit of the connected vehicle. The method further including: generating a resource provisioning log to track the resource provisioned to the vehicular micro cloud; and modifying the operation of the communication unit of the connected vehicle to send the resource provisioning log to the communication server so that an allocation is provided to the connected vehicle by the communication server based on the resource provisioning log. The method where the allocation includes a modification of one or more parameters that are allocated to the connected vehicle so that performance of the connected vehicle is improved based on the modification of the one or more parameters. The method further including: verifying the notification message by checking a signature of the communication server included in the notification message; and responsive to the notification message being verified, advertising the notification message within the vehicular micro cloud, outside the vehicular micro cloud or a combination thereof. The method further including: generating a proof of validity for the resource provisioning log; and modifying the operation of the communication unit of the connected vehicle to send the proof of validity together with the resource provisioning log to the communication server via the V2X communication. Implementations of the described techniques may include hardware, a method or process, or computer software on a computer-accessible medium.

One general aspect includes a system of a connected vehicle, including a processor and a non-transitory memory storing computer code which, when executed by the processor, causes the processor to: modify an operation of a communication unit of the connected vehicle to receive a notification message from a communication server via a Vehicle-to-Everything (V2X) communication; determine that an allocation function included in the notification message meets an expectation of the connected vehicle, where the allocation function is configured to satisfy a resource demand of the vehicular micro cloud while limiting a total allocation distributed by the communication server; and responsive to the allocation function meeting the expectation of the connected vehicle, provision a resource requested by the notification message to the vehicular micro cloud for use by any member of the vehicular micro cloud. Other embodiments of this aspect include corresponding computer systems, apparatus, and computer programs recorded on one or more computer storage devices, each configured to perform the actions of the methods.

Implementations may include one or more of the following features. The system where the allocation function describes a function that specifies a total amount of the resource supplied in the vehicular micro cloud during a target time period. The system where: responsive to determining that the total amount of the resource supplied in the vehicular micro cloud does not exceed the resource demand of the vehicular micro cloud, the allocation function is an increasing function that specifies the total amount of the resource supplied in the vehicular micro cloud so that the resource demand of the vehicular micro cloud is met by causing host vehicles to provision the resource to the vehicular micro cloud; and responsive to determining that the total amount of the resource supplied in the vehicular micro cloud exceeds the resource demand, the allocation function is a decreasing function that specifies the total amount of the resource supplied in the vehicular micro cloud so that the total allocation distributed by the communication server is limited. The system where the allocation function is a non-increasing function of the total amount of the resource supplied in the vehicular micro cloud. The system where the computer code, when executed by the processor, causes the processor to determine that the allocation function included in the notification message meets the expectation of the connected vehicle at least by: determining a suggested allocation based on the allocation function; determining an expected allocation of the connected vehicle for provisioning the resource to the vehicular micro cloud; and responsive to the suggested allocation satisfying the expected allocation, determining that the allocation function included in the notification message meets the expectation of the connected vehicle. Implementations of the described techniques may include hardware, a method or process, or computer software on a computer-accessible medium.

One general aspect includes a computer program product including a non-transitory memory storing computer-executable code that, when executed by a processor, causes the processor to: modify an operation of a communication unit of the connected vehicle to receive a notification message from a communication server via a Vehicle-to-Everything (V2X) communication; determine that an allocation function included in the notification message meets an expectation of the connected vehicle, where the allocation function is configured to satisfy a resource demand of the vehicular micro cloud while limiting a total allocation distributed by the communication server; and responsive to the allocation function meeting the expectation of the connected vehicle, provision a resource requested by the notification message to the vehicular micro cloud for use by any member of the vehicular micro cloud. Other embodiments of this aspect include corresponding computer systems, apparatus, and computer programs recorded on one or more computer storage devices, each configured to perform the actions of the methods.

Implementations may include one or more of the following features. The computer program product where the allocation function describes a function that specifies a total amount of the resource supplied in the vehicular micro cloud during a target time period. The computer program product where: responsive to determining that the total amount of the resource supplied in the vehicular micro cloud does not exceed the resource demand of the vehicular micro cloud, the allocation function is an increasing function that specifies the total amount of the resource supplied in the vehicular micro cloud so that the resource demand of the vehicular micro cloud is met by causing host vehicles to provision the resource to the vehicular micro cloud; and responsive to determining that the total amount of the resource supplied in the vehicular micro cloud exceeds the resource demand, the allocation function is a decreasing function that specifies the total amount of the resource supplied in the vehicular micro cloud so that the total allocation distributed by the communication server is limited. The computer program product where the allocation function is a non-increasing function of the total amount of the resource supplied in the vehicular micro cloud. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 1D and 1E are graphic representations illustrating different allocation functions according to some embodiments.

DETAILED DESCRIPTION

Figure 1A:
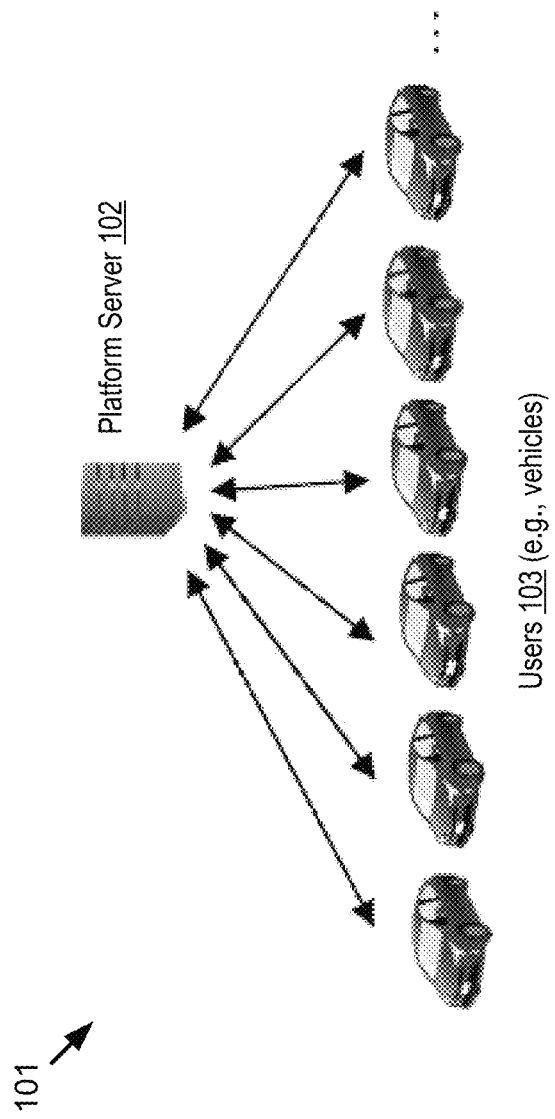
FIG. 1A is a block diagram illustrating an example architecture to facilitate user contributions to a crowd sourcing system or a mobile crowd sensing system.

Connected vehicles that are close by one another can form a vehicular micro cloud and are referred to as "cloud members" or "members of the vehicular micro cloud" herein. The connected vehicles collaboratively perform computation, data storage, sensing, communication tasks and any combination thereof among the cloud members over Vehicle-to-Everything (V2X) networks such as Vehicle-to-Vehicle (V2V) networks, including but not limited to the following: (1) collaboratively performing resource-intensive computational tasks among the multiple cloud members; (2) collaboratively keeping and updating data content among the multiple cloud members; (3) collaboratively performing sensing of road conditions by on-board sensors of the multiple cloud members; and (4) collaboratively downloading or uploading data content from or to a cloud server (or an edge server).

Using vehicular micro clouds removes the need for the connected vehicles to access remote cloud servers or edge servers by vehicle-to-network (V2N) communications (e.g., by cellular networks) whenever they need to get access to data (e.g., high-definition road map for automated driving). Depending on mobility of the vehicular micro clouds, the vehicular micro clouds can be categorized into two types by way of examples: a stationary vehicular micro cloud; and a mobile vehicular micro cloud.

A stationary vehicular micro cloud can be tied to a certain geographical region (e.g., an intersection). A vehicle joins a stationary vehicular micro cloud when entering a pre-defined geographical region of the stationary vehicular micro cloud and leaves the stationary vehicular micro cloud when exiting from the pre-defined geographical region. When exiting from the pre-defined geographical region, the vehicle also hands over on-going tasks and data of the stationary vehicular micro cloud to other cloud members. In some embodiments, parked vehicles can also be members of the stationary vehicular micro cloud.

In a mobile vehicular micro cloud, a cloud leader (e.g., a connected vehicle which acts as a leader in the vehicular micro cloud) can invite its neighboring vehicles to join the mobile vehicular micro cloud. Unlike the stationary vehicular micro cloud, the mobile vehicular micro cloud moves as the cloud leader moves. The cloud leader recruits other cloud members into the mobile vehicular micro cloud and distributes sub-tasks to the other cloud members for collaborative task execution.

In some scenarios, a vehicular micro cloud can be used to provide services to connected vehicles that are members of the vehicular micro cloud. These services are referred to herein as "cloudification services." These cloudification services include, for example, one or more of the following: dynamic map generation, cooperative path planning, and distributed data storage. In some embodiments, the members of the vehicular micro cloud can also offer services to members of other vehicular micro or macro clouds.

However, each vehicle that is a member of a vehicular micro cloud has a limited amount of resources that can be used by other members of the vehicular micro cloud. For example, each vehicle has limited amounts of the following onboard resources: central processing unit (CPU) power; memory; data storage; communication bandwidth; communication throughput; onboard sensors; and sensor data. Other members of the vehicular micro cloud may request cloudification services from members of the vehicular micro cloud that are referred to as "host vehicles." A host vehicle is a member of the vehicular micro cloud that fulfills a cloudification service request.

In some cases, other members of the vehicular micro cloud request numerous cloudification services to be performed at the same time or overlapping times by a host vehicle that is also a member of the vehicular micro cloud. If a particular cloudification service request for the host vehicle consumes too much onboard resources of the host vehicle, then fulfilling this particular cloudification service request can degrade the host vehicle's ability to fulfill the other cloudification services that are requested during the overlapping times. Experience shows that this issue may limit the real-world ability of using vehicular micro clouds to provide cloudification services.

For example, vehicle cloudification requires vehicles to offer computational resources, communication resources, sensor resources or a combination thereof of onboard computer units for collaborative task execution. However, the use of onboard sensor resources usually increases the battery consumption, eventually affecting fuel consumption. The use of communication resources may consume a vehicle's or driver's remaining data communication budget (depending on data plans). In addition, there might be potential privacy and security risks when offering resources of a vehicle to other vehicles.

When enrolling in telematics services, vehicle owners typically sign an agreement to provide vehicle-generated sensor data to a system operator (e.g., au automaker) via vehicular networks, so that the system operator can improve its services (e.g., navigation, tracking of a stolen vehicle, early diagnostics, etc.). Such an agreement-based approach is also applicable to vehicle cloudification: vehicle owners may sign an agreement to provide vehicle-based resources to vehicular clouds, managed by a particular system operator (e.g., an automaker). However, it may not work well in scenarios that have multiple system operators: a first group of vehicles agrees to offer vehicle-based resources to system operator A's vehicular clouds, while a second group of vehicles agrees to offer vehicle-based resources to system operator B's vehicular clouds. In order to motivate vehicles in the second group to contribute their vehicle-based resources to system operator A's vehicular clouds (and vice versa), an allocation mechanism described in some embodiments herein may be adopted to provide allocations to the vehicles in the second group (or the first group) so that performance or operation of the vehicles in the second group (or the first group) is improved based on the allocations.

FIG. 1A shows an example architecture 101 to facilitate user contributions to a crowd sourcing system or a mobile crowd sensing system. In the example architecture 101, a platform server 102 notifies users 103 of tasks (e.g., sensing tasks using their sensors), along with information about allocations. The users 103 may include various vehicles that are communicatively coupled to the platform server 102. The users 103 may decide whether or not to perform the tasks based on their own criteria. If a user 103 decides to perform a task, the user 103 submits a task-execution result to the platform server 102 when execution of the task completes. The platform server 102 then offers an allocation for the user's contribution to the task execution. However, by using the architecture 101, frequent interactions with the platform server 102 are needed. For example, when a user 103 wants to make a contribution to the task execution, it first needs to interact with the platform server 102 to negotiate an allocation, which may cause scalability issues and non-negligible communication overhead in the architecture 101. Besides, vehicles without V2N communication capabilities cannot communicate with the platform server 102 and therefore cannot participate in the task execution.

Embodiments described herein provide a solution that ensures that vehicles reserve enough of their resources for use by other members of the vehicular micro cloud(s) so that all requests for cloudification services can be fulfilled within the vehicular micro cloud(s). For example, a resource manager is described below in more detail which is capable of ensuring that a resource need of a vehicular micro cloud is met while limiting a total allocation distributed by a communication server.

As described in embodiments herein, a vehicular micro cloud includes a set of connected vehicles that share their computing resources and computing services with one another. A computing resource includes, for example, memory capacity, processing power, network bandwidth, and any other type of computing resource. A computing service includes, for example, executing software for a connected vehicle, executing calculations for a connected vehicle, sending/receiving messages for a connected vehicle, finding digital data for a connected vehicle that is stored by any member of the vehicular micro cloud, getting many different members of the vehicular micro cloud to help a connected vehicle with calculations, etc.

In a vehicular micro cloud described herein, members of the vehicular micro cloud share computing resources and computing services with other members, and this is not done in a standard V2X communication. That is, a vehicular micro cloud described herein cannot be any two vehicles that merely communicate with one another via a V2X communication without sharing of the computing resources, the computing services or a combination thereof.

As described herein, examples of Vehicle-to-Everything (V2X) communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

Example Overview

Figure 1B:
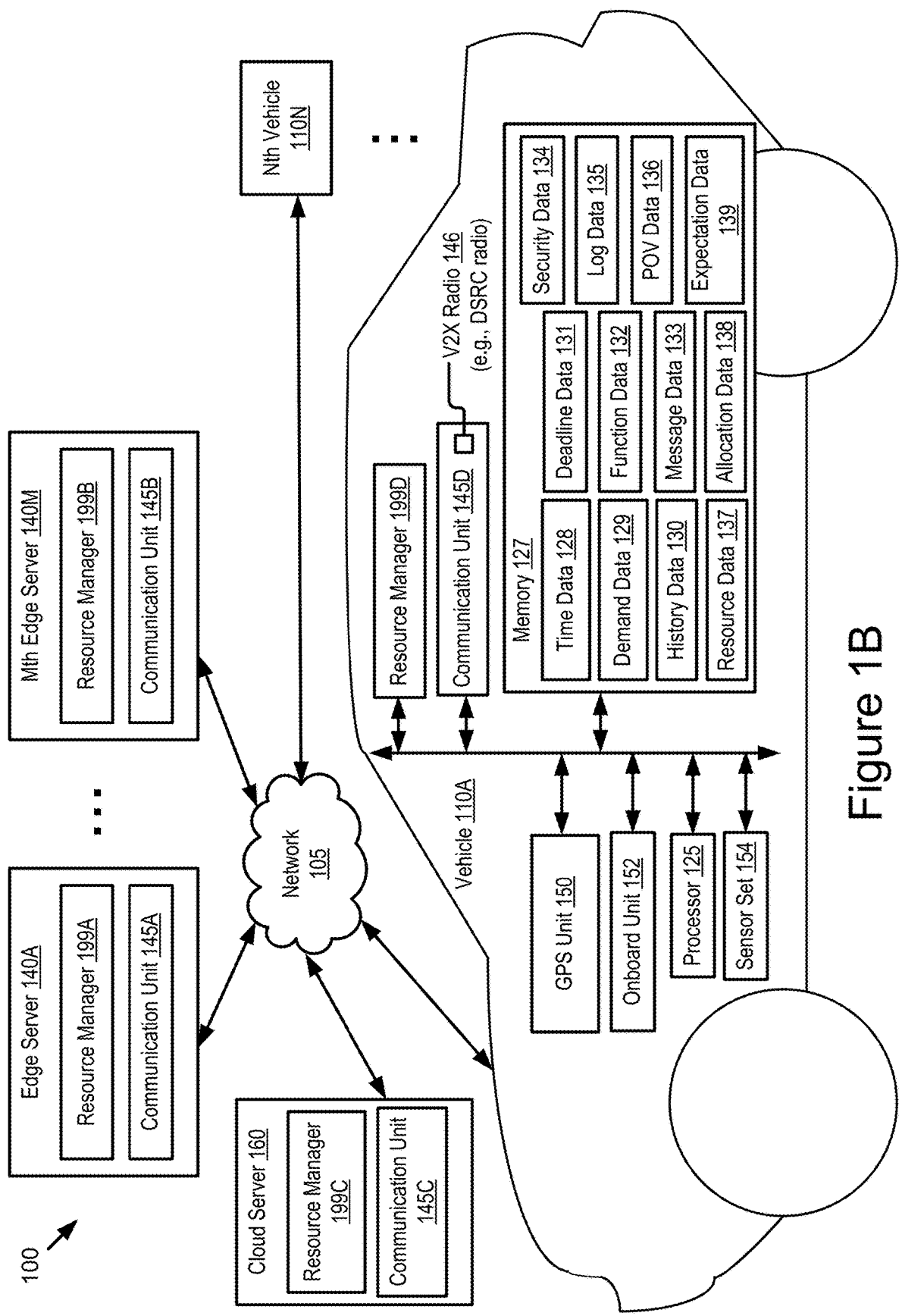
FIG. 1B is a block diagram illustrating an operating environment for a resource manager according to some embodiments.

Referring to FIG. 1B, depicted is an example operating environment 100 for resource managers 199A, 199B, 199C and 199D. For example, the operating environment 100 includes one or more vehicles 110, one or more edge servers 140, and a cloud server 160.

The resource managers 199A, 199B, 199C and 199D are referred to herein collectively or individually as a "resource manager 199" or the "resource managers 199."

The one or more vehicles 110 include a first vehicle 110A . . . and an Nth vehicle 110N. As used here, N is a positive integer greater than or equal to one. In some embodiments, the first vehicle 110A . . . and the Nth vehicle 110N provide similar functionality. The first vehicle 110A . . . and the Nth vehicle 110N are referred to herein individually or collectively as a "vehicle 110" or the "vehicles 110."

The one or more edge servers 140 include a first edge server 140A . . . and an Mth edge server 140M. As used here, M is a positive integer greater than or equal to one. In some embodiments, the first edge server 140A . . . and the Mth edge server 140M provide similar functionality. The first edge server 140A . . . and the Mth edge server 140M are referred to herein individually or collectively as an "edge server 140" or "the edge servers 140."

The vehicles 110, the edge servers 140, and the cloud server 160 of the operating environment 100 are communicatively coupled to a network 105. Optionally, the operating environment 100 further includes one or more roadside units ("RSUs" if plural, and "RSU" if singular) or other infrastructure devices (not shown in FIG. 1B).

Although two vehicles 110, two edge servers 140, one cloud server 160, and one network 105 are depicted in FIG. 1B, in practice the operating environment 100 may include one or more vehicles 110, one or more edge servers 140, one or more cloud servers 160, and one or more networks 105.

For example, there are "N" number of vehicles 110 nearby the vehicle 110 having the resource manager 199. However, it is not required that all of the "N" number of vehicles 110 include a resource manager 199. In some embodiments, some or all of the "N" vehicles include their own instance of the resource manager 199.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 includes a V2X network (e.g., a V2X wireless network). The V2X network is a communication network that enables entities such as elements of the operating environment 100 to wirelessly communicate with one another via one or more of the following: Wi-Fi; cellular communication including 3G, 4G, LTE, 5G, etc.; Dedicated Short Range Communication (DSRC); millimeter wave communication; etc.

In some embodiments, the resource manager 199 may be installed in a variety of connected endpoints located in a roadside environment. The connected endpoints may be connected vehicles (e.g., the vehicle 110) or any other processor-based connected endpoints such as a roadside unit, the edge server 140, the cloud server 160, etc. For example, an instance of the resource manager 199 (e.g., a resource manager 199A) is installed in the edge server 140A, an instance of the resource manager 199 (e.g., a resource manager 199B) is installed in the edge server 140M, an instance of the resource manager 199 (e.g., a resource manager 199C) is installed in the cloud server 160, and an instance of the resource manager 199 (e.g., a resource manager 199D) is installed in the vehicle 110. The resource manager 199 operates in a distributed manner across the variety of connected endpoints to form a communication server (e.g., any combination of cloud servers, edge servers and connected vehicles may include instances of the resource manager 199 so that the functionality of the resource manager 199 (or the functionality of the communication server) is implemented in a distributed fashion among two or more endpoints connected to the network 105).

In some embodiments, the resource manager 199 is installed in onboard units of a plurality of connected vehicles. The plurality of connected vehicles is organized into vehicular micro clouds or vehicular macro clouds ("vehicular clouds"). In this way, the connected vehicles share their computing resources with one another (e.g., their computational abilities, storage abilities, etc.) to provide cloudification services to different connected vehicles. In this case, the resource manager 199 operates in a distributed manner across the variety of connected vehicles to form a communication server.

Vehicular clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

Generally described, the resource manager 199 of the communication server is operable to provide the following example functionality: determining a resource need (or a resource demand) of the vehicular cloud; notifying the members of the resource need (or the resource demand) of the vehicular cloud; and taking actions to ensure that the members allocate sufficient computing resources to meet the resource need (or resource demand) of the vehicular cloud.

The communication server formed by a set of connected endpoints, as well as the resource manager 199 installed in the set of connected endpoints in a distributed manner, is described below in more detail with reference to FIGS. 1C, 2A and 3-5B.

In some embodiments, an instance of the resource manager 199 is also installed in a host vehicle that fulfills a cloudification service request. The host vehicle may have a structure similar to that of the vehicle 110, and description described herein for the vehicle 110 may also be applicable to the host vehicle. The resource manager 199 installed in the host vehicle is described below in more detail with reference to FIGS. 1C, 2B and 6-8B.

In some embodiments, the resource manager 199 may be implemented using hardware including a field-programmable gate array ("FPGA") or an application-specific integrated circuit ("ASIC"). In some other embodiments, the resource manager 199 may be implemented using a combination of hardware and software. The resource manager 199 may be stored in a combination of the devices (e.g., vehicles or other devices), or in one of the devices.

The edge server 140 includes a processor-based computing device which is installed in a roadside unit ("RSU") or some other processor-based infrastructure component of a roadway. In the operating environment 100 illustrated in FIG. 1B, the roadway includes M edge servers 140A . . . 140M, where M is any positive integer greater than or equal to one. The edge server 140A includes the resource manager 199A and a communication unit 145A. The edge server 140M includes the resource manager 199B and a communication unit 145B.

In some embodiments, edge servers 140 are not available. For example, roadside units may not be available in rural environments to serve as edge servers. Accordingly, the cloud server 160 can host an instance of the resource manager 199 (e.g., the resource manager 199C) so that this cloud-based resource manager can serve rural vehicles. Accordingly, embodiments described herein can be applied in urban environments as well as rural environments.

The communication units 145A, 145B and 145C (as well as a communication unit 145D in the vehicle 110) may have similar structure and provide similar functionality. Thus, the communication units 145A, 145B, 145C and 145D can be referred to as "communication unit 145" individually or collectively.

The communication unit 145 transmits and receives data to and from the network 105 or to another communication channel. In some embodiments, the communication unit 145 may include a DSRC transceiver, a DSRC receiver and other hardware or software necessary to make the corresponding connected endpoint a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 146 used for conducting V2X communications. For example, the V2X radio 146 includes a DSRC radio. In another example, the V2X radio 146 includes hardware, software, or a combination thereof for performing mmWave communications. Other examples of the V2X radio 146 are possible. It should be noted that DSRC is not a requirement here. Embodiments described herein can be implemented with any form of V2X communications.

In some embodiments, the vehicle 110 may be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the geographic position of the vehicle with lane-level accuracy.

In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

The vehicle 110 may be any type of vehicle. The vehicle 110 may be one of the following types of vehicles: a car; a truck; a sports utility vehicle; a bus; a semi-truck; a drone or any other roadway-based conveyance. In some embodiments, the vehicle 110 includes a communication unit such that the vehicle is a "connected vehicle," where the communication unit includes any hardware and software that is needed to enable the vehicle 110 to communicate with other entities via the network 105.

In some embodiments, the vehicle 110 may be an autonomous vehicle or a semi-autonomous vehicle. For example, the vehicle 110 may include one or more Advanced Driver-Assistance Systems (ADAS systems). The one or more ADAS systems may provide some or all of the functionality that provides autonomous functionality.

Figure 2A:
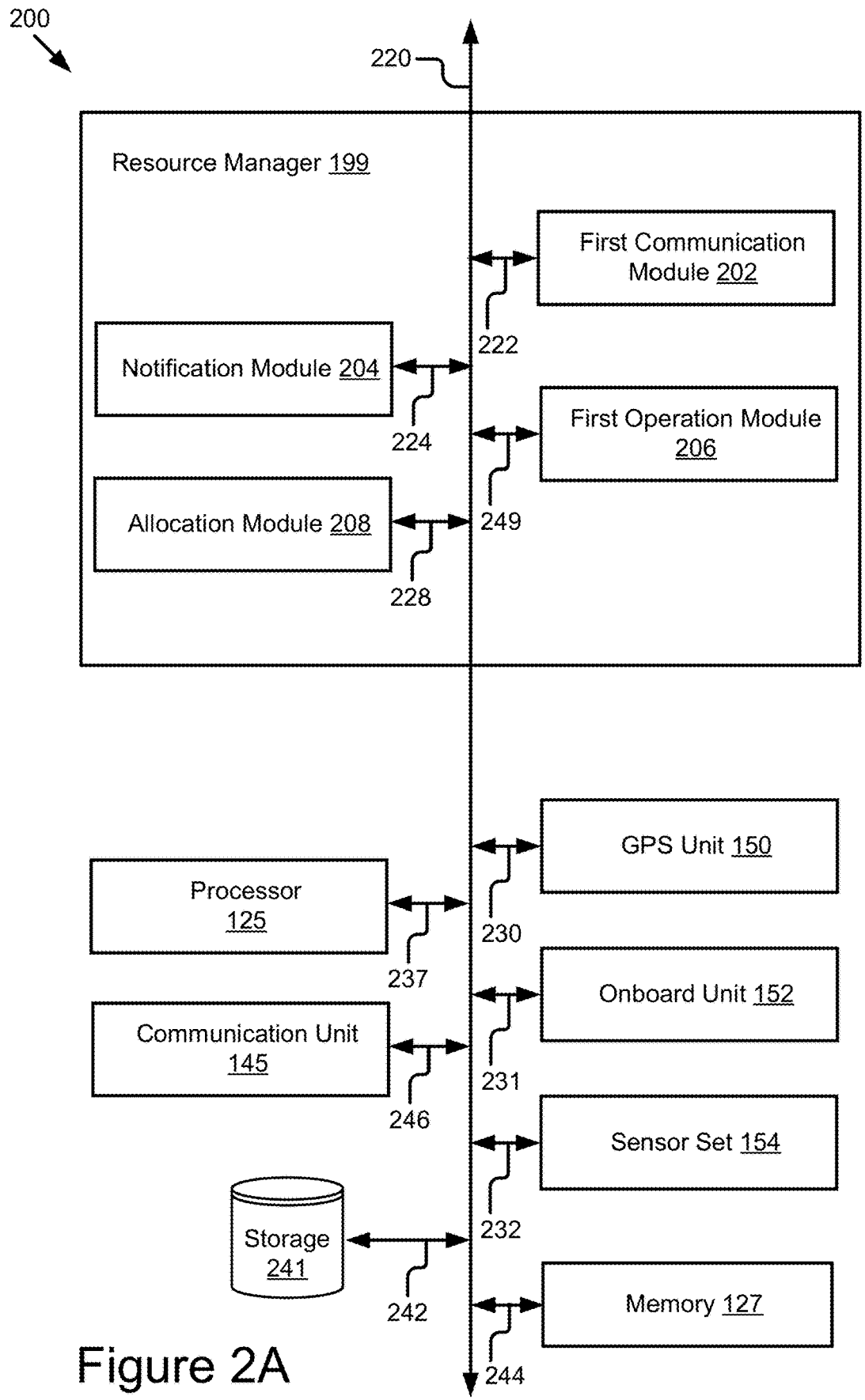
FIG. 2A is a block diagram illustrating an example computer system including a resource manager on a side of a communication server according to some embodiments.

In some embodiments, the vehicle 110 may be one of the connected endpoints that form the communication server (see, e.g., FIG. 2A). In some embodiments, the vehicle 110 may be a host vehicle that fulfills a cloudification request (see, e.g., FIG. 2B). In some embodiments, the vehicle 110 may act as both a host vehicle and a connected endpoint that is an element of the communication server.

In some embodiments, the vehicle 110 includes the resource manager 199, the communication unit 145, a processor 125, a memory 127, a GPS unit 150, an onboard unit 152 and a sensor set 154.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 110 may include one or more processors 125. Other processors, operating systems, sensors, displays, and physical configurations may be possible.

For example, the processor 125 can be an element of the onboard unit 152 or an electronic control unit of the vehicle 110.

The memory 127 stores instructions or data that may be executed by the processor 125 of the vehicle 110. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The vehicle 110 may include one or more memories 127.

In some embodiments, the memory 127 stores one or more of the following elements: time data 128; demand data 129; history data 130; deadline data 131; function data 132; message data 133; security data 134; log data 135; proof of validity (POV) data 136; resource data 137; allocation data 138; and expectation data 139.

In some embodiments, the vehicle 110 acts as an endpoint of the communication server. The time data 128 includes digital data that describes a designated time interval for generating a new notification message since a last notification message is generated by the communication server. In some embodiments, the vehicle 110 acts as a host vehicle. The time data 128 includes digital data that describes a designated time interval since a last notification message is received by the vehicle 110.

The demand data 129 includes digital data that describes resource demands (or resource needs) in a vehicular micro cloud at various different times. The demand data 129 is specified by a notification message generated by the communication server.

The history data 130 includes digital data that describes historical resource demands (or historical resource needs) for a particular vehicular micro cloud.

The deadline data 131 includes digital data that describes a deadline for an allocation to be claimed. The deadline data 131 is specified by the notification message.

The function data 132 includes digital data that describes an allocation function. The allocation function describes how much of an allocation the vehicle 110 receives in exchange for reserving one or more resources for use by the other members of the vehicular micro cloud. The allocation function is specified by the notification message. The allocation function is described below in more detail with reference to FIGS. 1D and 1E.

The message data 133 includes digital data that describes a notification message. The notification message is generated by the resource manager 199 of the communication server. The notification message describes, for example, one or more of the following for each vehicular micro cloud: (1) a target time period; (2) a description of a set of resources to be requested (e.g., a type and an amount of each resource in the set of resources to be requested); (3) an allocation function; and (4) a deadline to claim the allocation. In some embodiments, a plurality of endpoints acts as the communication server in a distributed fashion and cooperates with one another to generate and distribute the notification message. In some embodiments, the notification message may also include a signature of the communication server so that the notification message can be verified by other vehicles that receive the notification message via the network 105.

The security data 134 includes digital data that describes information that is used to encrypt a wireless message such as a private key or some other type of cryptographic information.

The log data 135 includes digital data that describes a resource provisioning log. The resource provisioning log is described below in more detail.

The POV data 136 includes digital data that describes a proof of validity for a resource provisioning log. The POV data 136 may be attached to the resource provisioning log.

The resource data 137 includes digital data that describes types and amounts of resources that are reserved by the vehicle 110 for use by other members of the vehicular micro cloud and an amount of time that these resources are reserved.

The allocation data 138 includes digital data describing an allocation provided to the vehicle 110 by the communication server in exchange for the vehicle's provisioning of one or more resources to the vehicular micro cloud for use by any other members of the vehicular micro cloud. The allocation is described below in more detail.

The expectation data 139 includes digital data that describes an expected allocation of the vehicle 110 in exchange for provisioning the resources requested or specified by the notification message to the vehicular micro cloud. In some embodiments, the expected allocation of the vehicle 110 may be identical to or different from an actual allocation received from the communication server.

In some embodiments, the GPS unit 150 is a conventional GPS unit of the vehicle 110. For example, the GPS unit 150 may include hardware that wirelessly communicates with a GPS satellite to retrieve data that describes a geographic location of the vehicle 110. For example, the GPS unit 150 retrieves GPS data from one or more GPS satellites. In some embodiments, the GPS unit 150 is a DSRC-compliant GPS unit of the vehicle 110 that is operable to provide GPS data describing the geographic location of the vehicle 110 with lane-level accuracy.

The onboard unit 152 can include one or more processors and one or more memories. For example, the onboard unit 152 includes an electronic control unit (ECU). The ECU is an embedded system in automotive electronics that controls one or more of electrical systems or subsystems in the vehicle 110. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the resource manager 199 of the vehicle 110 is installed in the onboard unit 152.

The sensor set 154 includes one or more sensors that are operable to measure a roadway environment outside of the vehicle 110. For example, the sensor set 154 may include one or more sensors that record one or more physical characteristics of the road environment that is proximate to the vehicle 110. The memory 127 may store sensor data that describes the one or more physical characteristics recorded by the sensor set 154. The roadway environment outside of the vehicle 110 may include the other vehicles (as well as other objects or people) in the operating environment 100, and so, one or more sensors of the sensor set 154 may record sensor data that describes information about the other vehicles (as well as other objects or people) in the operating environment 100.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

For example, the sensor set 154 includes any sensors which are needed to detect events occurring in the roadway environment that includes the vehicle 110. Examples of suitable sensors include, but are not limited to: exterior mounted cameras; LIDAR; radar; and other range-finding sensors, etc.

Figure 1C:
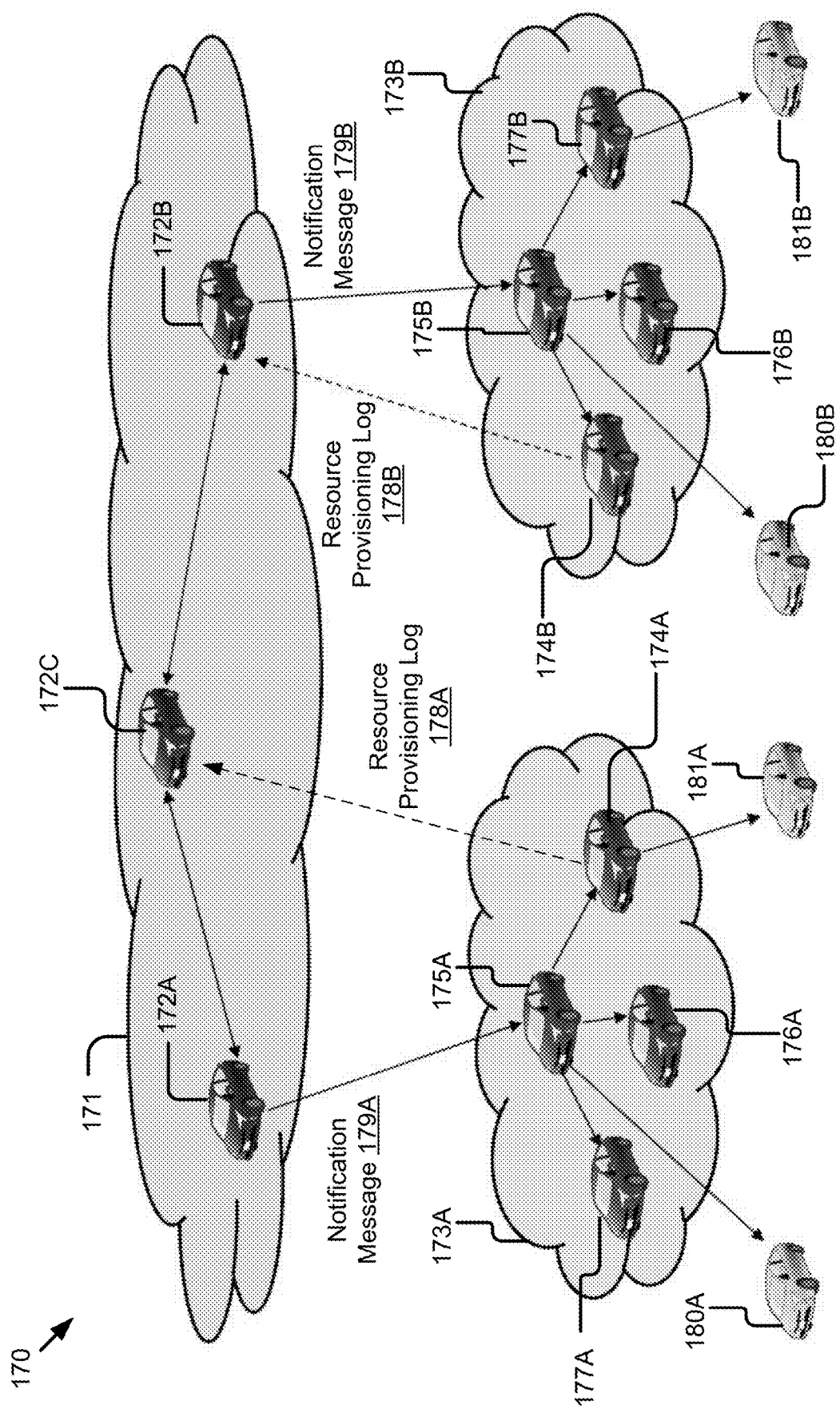
FIG. 1C is a graphic representation illustrating an example application scenario for a resource manager according to some embodiments.

Referring to FIG. 1C, an example application scenario 170 for the resource manager 199 is illustrated according to some embodiments. In the application scenario 170, a vehicular macro cloud 171 is illustrated that includes various authorized vehicles (e.g., vehicles 172A, 172B and 172C) as members. The various authorized vehicles are interconnected with one another via a V2X network (e.g., DSRC, mmWave, cellular, etc.). In some embodiments, a set of the authorized vehicles collectively hosts a distributed communication server so that each authorized vehicle in the set of the authorized vehicles is installed with an instance of the resource manager 199. The resource manager 199 installed in the set of the authorized vehicles in a distributed manner provides the functionality of the communication server described herein.

For example, a set of authorized vehicles (e.g., shared mobility vehicles, public transportation vehicles, etc.) runs a distributed communication server. The set of authorized vehicles is interconnected over vehicular networks (e.g., DSRC, cellular, etc.), so that the set of authorized vehicles can virtually serve as a single server. In some examples, the communication server can be also hosted by a remote cloud server or an edge server in a backbone network.

In some embodiments, the vehicular macro cloud 171 also includes various vehicular micro clouds (e.g., vehicular micro clouds 173A and 173B). Each of the various vehicular micro clouds includes multiple vehicles as members of the corresponding vehicular micro cloud. For example, the vehicular micro cloud 173A includes vehicles 174A, 175A, 176A and 177A, and the vehicular micro cloud 173B includes vehicles 174B, 175B, 176B and 177B.

In the application scenario 170, multiple non-member vehicles (e.g., vehicles 180A, 181A, 180B and 181B) are also depicted, and these vehicles are not members of the vehicular micro clouds 173A and 173B. The non-member vehicles 180A, 181A, 180B and 181B may or may not be members of the vehicular macro cloud 171.

In some embodiments, the various vehicles described here may have a structure similar to that of the vehicle 110 shown in FIG. 1B. Similar description is not repeated here. For example, at least a part of the various vehicles described here are installed with an instance of the resource manager 199 respectively.

In some embodiments, the resource manager 199 includes code and routines, when executed by one or more processors, to cause the one or more processors to execute one or more of the following procedures.

Procedure (1): Various instances of the resource manager 199 installed in various endpoints provide functionality of a communication server. For example, with reference to FIG. 1C, various instances of the resource manager 199 installed in various authorized vehicles (e.g., vehicles 172A, 172B, and 172C) form the communication server in a distributed manner.

Procedure (2): The resource manager 199 of the communication server generates a corresponding notification message for each of the vehicular micro clouds. The corresponding notification message includes: (a) a target time period; (b) a description of at least one resource (e.g., a type and an amount of the at least one resource) to be requested; (c) an allocation function; and (d) a deadline to claim an allocation from the communication sever. For example, with reference to FIG. 1C, the communication server generates a notification message 179A for the vehicular micro cloud 173A and a notification message 179B for the vehicular micro cloud 173B.

Procedure (3): For each vehicular micro cloud, the resource manager 199 of the communication server distributes the corresponding notification message to one or more members of the corresponding vehicular micro cloud. For example, with reference to FIG. 1C, the resource manager 199 of the authorized vehicle 172A in the communication server distributes the notification message 179A to the vehicle 175A of the vehicular micro cloud 173A. The resource manager 199 of the authorized vehicle 172B in the communication server distributes the notification message 179B to the vehicle 175B of the vehicular micro cloud 173B.

Procedure (4): In each vehicular micro cloud, the resource managers 199 of the one or more members receive the corresponding notification message. In some embodiments, the one or more members of the vehicular micro cloud verify the corresponding notification message by checking a signature of the communication server included in the corresponding notification message. Responsive to the corresponding notification message being verified, the resource managers 199 of the one or more members advertise the corresponding notification message respectively within the vehicular micro cloud, outside the vehicular micro cloud or a combination thereof to invite more vehicles to provision the resource(s) requested in the corresponding notification message. In some embodiments, the corresponding notification message is repeatedly advertised by members of the vehicular micro cloud over a V2X network.

For example, with reference to FIG. 1C, in the vehicular micro cloud 173A, the vehicle 175A receives the notification message 179A from the authorized vehicle 172A and checks a signature of the communication server to verify the notification message 179A. If the notification message 179A is verified, the vehicle 175A forwards the notification message 179A to: (1) the vehicles 174A, 176A and 177A that are also members of the vehicular micro cloud 173A; and (2) the vehicles 180A and 181A that are not members of the vehicular micro cloud 173A. In this way, more and more vehicles can be informed by the notification message 179A and invited to provision resources requested in the notification message 179A. However, on the other hand, if the notification message 179A is not verified, the notification message 179A is discarded by the vehicle 175A.

Similarly, with reference to FIG. 1C, in the vehicular micro cloud 173B, the vehicle 175B receives the notification message 179B from the authorized vehicle 172B and checks a signature of the communication server to verify the notification message 179B. If the notification message 179B is verified, the vehicle 175B forwards the notification message 179B to: (1) the vehicles 174B, 176B and 177B that are also members of the vehicular micro cloud 173B; and (2) the vehicles 180B and 181B that are not members of the vehicular micro cloud 173B. In this way, more and more vehicles can be informed by the notification message 179B and invited to provision resources requested in the notification message 179B. However, on the other hand, if the notification message 179B is not verified, the notification message 179B is discarded by the vehicle 175B.

Procedure (5): In each vehicular micro cloud, the resource managers 199 of the members (that receive the corresponding notification message) determine whether an allocation offered by the corresponding notification message meets their expectations in exchange for reserving the requested resources for use by other members of the vehicular micro cloud. Different member vehicles may have different expectations as defined by their respective expectation data 139.

If an expectation is met for a particular vehicle, then the resource manager 199 of this particular vehicle releases one or more resources requested by the notification message (e.g., one or more specified computing resources) to the other members of the vehicular micro cloud and tracks the one or more resources it offers to these other vehicles to generate a resource provisioning log. The resource provisioning log specifies, for example, the one or more resources that are made available to the other members of the vehicular micro cloud. Here, this particular vehicle is referred to as a host vehicle for provisioning the one or more requested resources.

In some embodiments, the resource manager 199 of this particular vehicle generates a wireless message including its resource provisioning log as well as a proof that the one or more resources are actually made available to the other members of the vehicular micro cloud. The resource manager 199 of this particular vehicle then transmits this wireless message to the communication server.

In some embodiments, vehicles within a vehicular micro cloud (e.g., members of the vehicular micro cloud) or vehicles outside the vehicular micro cloud (e.g., non-members of the vehicular micro cloud) serve as host vehicles and offer their resources to the vehicular micro cloud responsive to the associated allocation function meeting their expectations. The host vehicles securely keep track of the resources that they offer to the vehicular micro cloud by generating their respective resource provisioning logs. The host vehicles are provided with allocations by submitting their respective resource provisioning logs to the communication server.

For example, with reference to FIG. 1C, the resource manager 199 of the vehicle 174A determines that an allocation offered by the notification message 179A meets its expectation in exchange for reserving a resource requested by the notification message 179A for use by other members of the vehicular micro cloud 173A. Then, the resource manager 199 of the vehicle 174A releases a particular amount of the resource requested by the notification message 179A to the other members of the vehicular micro cloud 173A and tracks a usage of the resource by the other members to generate a resource provisioning log 178A. The resource manager 199 of the vehicle 174A generates a V2X wireless message including the resource provisioning log 178A as well as a proof of validity that the resource is actually made available to the other members of the vehicular micro cloud 173A. The resource manager 199 of the vehicle 174A then transmits this V2X wireless message to the communication server.

Similarly, with reference to FIG. 1C, the resource manager 199 of the vehicle 174B determines that an allocation offered by the notification message 179B meets its expectation in exchange for reserving a resource requested by the notification message 179B for use by other members of the vehicular micro cloud 173B. Then, the resource manager 199 of the vehicle 174B releases a particular amount of the resource requested by the notification message 179B to the other members of the vehicular micro cloud 173B and tracks a usage of the resource by the other members to generate a resource provisioning log 178B. The resource manager 199 of the vehicle 174B generates a V2X wireless message including the resource provisioning log 178B as well as a proof of validity that the resource is actually made available to the other members of the vehicular micro cloud 173B. The resource manager 199 of the vehicle 174B then transmits this V2X wireless message to the communication server.

Procedure (6): The resource manager 199 of the communication server receives and aggregates various resource provisioning logs generated by various host vehicles. For each resource provisioning log generated by a particular host vehicle, the resource manager 199 of the communication server checks a proof of validity of the corresponding resource provisioning log to verify the corresponding resource provisioning log. Responsive to the corresponding resource provisioning log being verified, the resource manager 199 of the communication server provides an allocation to the host vehicle as specified based on the corresponding notification message and the corresponding resource provisioning log.

For example, with reference to FIG. 1C, the resource manager 199 of the authorized vehicle 172C receives the resource provisioning log 178A from the vehicle 174A. The resource manager 199 of the authorized vehicle 172C checks a proof of validity of the resource provisioning log 178A to verify the resource provisioning log 178A. Responsive to the resource provisioning log being verified, the resource manager 199 of the authorized vehicle 172C provides an allocation to the vehicle 174A as specified based on the notification message 179A and the resource provisioning log 178A.

Here, in FIG. 1C, the notification message 179A is generated by the authorized vehicle 172A while the allocation is determined by the authorized vehicle 172C. That is, the notification message and the allocation can be generated or determined by different endpoints of the communication server.

Similarly, with reference to FIG. 1C, the resource manager 199 of the authorized vehicle 172B receives the resource provisioning log 178B from the vehicle 174B. The resource manager 199 of the authorized vehicle 172B checks a proof of validity of the resource provisioning log 178B to verify the resource provisioning log 178B. Responsive to the resource provisioning log being verified, the resource manager 199 of the authorized vehicle 172B provides an allocation to the vehicle 174B as specified based on the notification message 179B and the resource provisioning log 178B.

Here, in FIG. 1C, the notification message 179B is generated by the authorized vehicle 172B and the allocation is also determined by the authorized vehicle 172B. That is, the notification message and the allocation can be generated or determined by the same endpoint of the communication server.

Figure 1D:
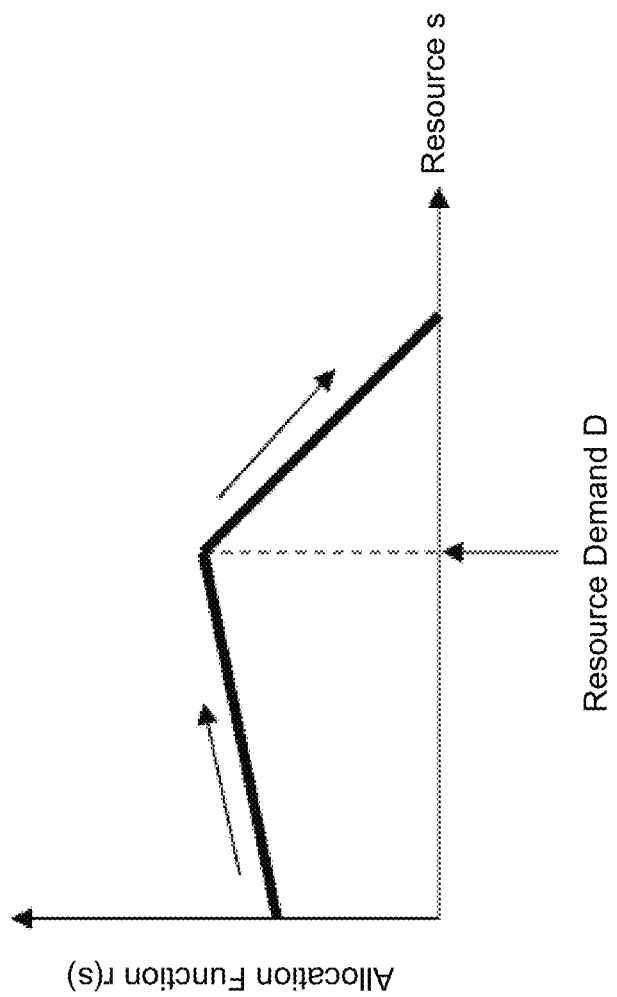

FIGS. 1D and 1E are graphic representations 195 and 196, respectively, illustrating different allocation functions according to some embodiments. In some embodiments, an allocation function is configured to satisfy a resource need (or resource demand) of a vehicular micro cloud while limiting a total allocation distributed by the communication server. In some embodiments, the allocation function describes a function that specifies a total amount of one or more resources supplied in the vehicular micro cloud during a target time period.

In some embodiments, responsive to determining that the total amount of the one or more resources supplied in the vehicular micro cloud does not exceed the resource demand of the vehicular micro cloud, the allocation function is an increasing function that specifies the total amount of the one or more resources supplied in the vehicular micro cloud so that the resource need of the vehicular micro cloud is met by causing more and more host vehicles to provision the one or more resources to the vehicular micro cloud. On the other hand, responsive to determining that the total amount of the one or more resources supplied in the vehicular micro cloud exceeds the resource demand, the allocation function is a decreasing function that specifies the total amount of the one or more resources supplied in the vehicular micro cloud so that the total allocation distributed by the communication server is limited. An example of this type of allocation functions is shown in FIG. 1D.

In FIG. 1D, an allocation function "r(s)" that is a linear function of a total amount of a resource "s" that is actually supplied to the vehicular micro cloud is illustrated. Responsive to the total amount of the resource "s" supplied to the vehicular micro cloud is less than or equal to a resource demand "D" (e.g., s≤D), a first part of a curve of the allocation function "r(s)" has an increasing slope. The increasing slope indicates that as more and more host vehicles participate to provision the resource to the vehicular micro cloud, a larger allocation is provided to each of the host vehicles (e.g., each of the host vehicles is allocated equally for bringing in more host vehicles to provision the resource).

For example, a value of the increasing slope is determined based on one or more of the following: a value of the resource demand "D" and a number of member vehicles in the vehicular micro cloud. For example, if the resource demand "D" has a value that exceeds a demand threshold (which indicates that the vehicular micro cloud has a large resource demand) and a total number of member vehicles in the vehicular micro cloud is below a member threshold (which indicates that the total number of member vehicles in the vehicular micro cloud is small), the value of the increasing slope can be increased so that the allocation is increased quickly when s<D to motivate more member vehicles of the vehicular micro cloud to invite other vehicles to provision the resource to the vehicular micro cloud. In this case, the resource demand "D" can be satisfied with a faster speed.

On the other hand, if the total amount of the resource "s" supplied to the vehicular micro cloud exceeds the resource demand "D" (e.g., s>D), a second part of the curve of the allocation function "r(s)" has a decreasing slope. The decreasing slope indicates that if a total number of the host vehicles that participate to provision the resource to the vehicular micro cloud exceeds a certain number (which already causes extra provisioning of the resource in the vehicular micro cloud), a decreasing allocation is provided to each of the host vehicles (e.g., each of the host vehicles is allocated equally with the decreasing allocation).

In some examples, a value of the decreasing slope is determined based on the total allocation to be distributed by the communication server. For example, if the total allocation is equal to or exceeds an allocation threshold (which indicates that the communication server provides a large total allocation), a value of the decreasing slope can be decreased so that the allocation is dropped slowly when s>D. If the total allocation is below the allocation threshold (which indicates that the communication server provides a small total allocation), a value of the decreasing slope can be increased so that the allocation is dropped quickly when s>D.

In some embodiments, the allocation function is a non-increasing function of the total amount of the one or more resources supplied in the vehicular micro cloud. An example of this type of allocation functions is shown in FIG. 1E.

In FIG. 1E, an allocation function "r(s)" that is a linear function of a total amount of a resource "s" that is actually supplied to the vehicular micro cloud is illustrated. The allocation function "r(s)" has a decreasing slope so that the total allocation distributed by the communication server is limited. However, the decreasing slope of the allocation function "r(s)" may cause member vehicles of the vehicular micro cloud not to advertise notification messages received from the communication server even if the resource provisioned in the vehicular micro cloud is scarce (e.g., the member vehicles may not want to invite more vehicles to provision the resource because it would reduce an allocation provided by the communication server due to the decreasing slope).

In embodiments described herein, an allocation that is provided by the communication server to a host vehicle includes a modification of one or more parameters that are allocated to the host vehicle so that performance or an operation of the host vehicle is improved based on the modification of the one or more parameters. For example, the modification of the one or more parameters includes, but is not limited to, one or more of the following: (1) allocating an additional amount of bandwidth to the host vehicle so that the operation of the communication unit 145 of the host vehicle is improved; (2) allocating an additional channel to the host vehicle so that the host vehicle can access the communication server with multiple channels to improve communication efficiency; (3) increasing a priority of the host vehicle to access a cloudification service provided by the communication server so that an access speed of the host vehicle to the cloudification service is increased; (4) increasing a real-time data downloading speed of the host vehicle so that real-time data is downloaded to the host vehicle from the communication server with a reduced latency to improve a driving experience of the host vehicle; (5) reducing an update interval of the host vehicle so that a frequency that configuration data of the host vehicle is updated with data from the communication server is increased to keep the configuration data of the host vehicle up to date.

With reference to FIGS. 1B-1E described above as well as FIGS. 2A-8B described below, referred to collectively in any combination or individually, a first example advantage of the embodiments described herein includes that a distributed secure architecture is provided herein by, for example, forming the communication server in a distributed manner, which removes the need for vehicles to frequently interact with trusted platform servers when providing resources to a vehicular cloud (e.g., a frequent interaction with the platform server 102 shown in FIG. 1A).

A second example advantage of the embodiments described herein includes an application of the allocation function that motivates vehicular cloud members to maintain a sufficient amount of resource providers (e.g., host vehicles) to satisfy a resource need of the vehicular micro cloud while limiting a total allocation that has to be distributed in the vehicular micro cloud. Other example advantages are possible.

In some embodiments, the allocation function describes a function of the total amount of the resource supplied in the vehicular micro cloud during the target time period. In some embodiments, the allocation function is operable to control the total amount of the resource supplied in the vehicular micro cloud during the target time period.

Example Computer System

Referring now to FIG. 2A, depicted is a block diagram illustrating an example computer system 200 including the resource manager 199 installed in an endpoint of the communication server according to some embodiments. In some embodiments, the computer system 200 may include a special-purpose computer system that is programmed to perform one or more steps of methods 300, 400, 500 and 550 described below with reference to FIGS. 3-5B.

In some embodiments, the endpoint with the resource manager 199 is the vehicle 110, and the computer system 200 is an on-board vehicle computer of the vehicle 110, an onboard unit of the vehicle 110, an electronic control unit (ECU), head unit or some other processor-based computing device of the vehicle 110. In some other embodiments, the endpoint with the resource manager 199 can be any other endpoint in the roadway environment. For simplicity and convenience of description, the following description of FIG. 2A assumes that the endpoint is the vehicle 110 without loss of generality.

The computer system 200 may include one or more of the following elements according to some examples: the resource manager 199; the processor 125; the memory 127; the communication unit 145; the GPS unit 150; the onboard unit 152; the sensor set 154; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The GPS unit 150 is communicatively coupled to the bus 220 via a signal line 230. The onboard unit 152 is communicatively coupled to the bus 220 via a signal line 231. The sensor set 154 is communicatively coupled to the bus 220 via a signal line 232. The storage 241 is communicatively coupled to the bus 220 via a signal line 242. The memory 127 is communicatively coupled to the bus 220 via a signal line 244.

The processor 125, the memory 127, the communication unit 145, the GPS unit 150, the onboard unit 152 and the sensor set 154 are described above with reference to FIG. 1B, and so, similar description will not be repeated here. The memory 127 may store any of the data described above with reference to FIGS. 1B-1E. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2A, the resource manager 199 includes: a first communication module 202; a notification module 204; a first operation module 206; and an allocation module 208. These components of the resource manager 199 are communicatively coupled to each other via the bus 220. In some embodiments, components of the resource manager 199 can be stored in a single device. In some other embodiments, components of the resource manager 199 can be distributed and stored across multiple devices.

The first communication module 202 can be software including routines for handling communications between the resource manager 199 and other components of the computer system 200. In some embodiments, the first communication module 202 can be stored in the memory 127 of the computer system 200 and can be accessible and executable by the processor 125. The first communication module 202 may be adapted for cooperation and communication with the processor 125 and other components of the computer system 200 via a signal line 222.

The first communication module 202 sends and receives data, via the communication unit 145, to and from one or more elements of the operating environment 100. For example, the first communication module 202 receives or transmits, via the communication unit 145, one or more of the following elements: resource provisioning logs; and notification messages. The first communication module 202 may send or receive any of the data or messages described above with reference to FIGS. 1B-1E via the communication unit 145.

In some embodiments, the first communication module 202 receives data from components of the resource manager 199 and stores the data in one or more of the storage 241 and the memory 127. For example, the first communication module 202 receives data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the first communication module 202 may handle communications between components of the resource manager 199. For example, the first communication module 202 may handle communications among the notification module 204, the first operation module 206 and the allocation module 208. Any of these systems or modules may cause the first communication module 202 to communicate with the other elements of the computer system 200 or the operating environment 100 (via the communication unit 145).

In some embodiments, the notification module 204 can be software including routines for generating a notification message. In some embodiments, the notification module 204 can be a set of instructions stored in the memory 127 of the computer system 200 and can be accessible and executable by the processor 125. The notification module 204 may be adapted for cooperation and communication with the processor 125 and other components of the computer system 200 via a signal line 224.

In some embodiments, the notification module 204 is operable to predict a resource demand in a vehicular micro cloud over a target time period. Specifically, the notification module 204 determines whether a designated time interval elapses since a generation of a last notification message. Responsive to that the designated time interval elapses, the notification module 204 predicts the resource demand in the vehicular micro cloud over the target time period based on one or more demand determination factors. For example, the notification module 204 predicts types of resources and amounts of the resources that are needed in the vehicular micro cloud during the target time period based on one or more demand determination factors.

Examples of the one or more demand determination factors include, but are not limited to, one or more of the following: historical information about a road traffic volume during the target time period; real-time information about the road traffic volume; positions and resource availability of individual vehicles in the roadway environment that are reported to the communication server; an amount of resources requested by users of vehicular micro cloud services; or any combination thereof.

In some embodiments, the notification module 204 is operable to determine, based on the resource demand, a set of resources to be requested in the vehicular micro cloud. For example, the notification module 204 determines one or more resources (e.g., one or more types and one or more amounts of the one or more resources) to be requested in the vehicular micro cloud during a target time period.

In some embodiments, the notification module 204 determines, based on the resource demand, an allocation function describing an allocating approach applied by the communication server. For example, the notification module 204 determines the allocation function based on one or more of the following: the resource demand; a number of member vehicles in the vehicular micro cloud; and a total allocation distributed by the communication server.

In a further example, assume that: (1) the allocation function has a curve similar to that of FIG. 1D; (2) the resource demand "D" has a value that exceeds a demand threshold (which indicates that the vehicular micro cloud has a large resource demand); (3) a total number of member vehicles in the vehicular micro cloud is below a member threshold (which indicates that the total number of member vehicles in the vehicular micro cloud is small); and (4) the total allocation is equal to or exceeds an allocation threshold (which indicates that the communication server provides a large total allocation). The notification module 204 may determine that: (1) for a first part of the curve in the allocation function "r(s)" where 9, a value of an increasing slope of the first part of the curve can be increased to motivate more member vehicles of the vehicular micro cloud to invite other vehicles to provision the resource to the vehicular micro cloud (due to that the vehicular micro cloud has a large resource demand and the total number of member vehicles in the vehicular micro cloud is small); and (2) for a second part of the curve in the allocation function "r(s)" where s>D, a value of a decreasing slope of the second part of the curve can be decreased (due to that the total allocation provided by the communication server is large).

In some embodiments, the notification module 204 generates a notification message based on the set of resources to be requested and the allocation function. For example, the notification module 204 generates the notification message to include one or more of the following: a description of the set of resources to be requested; a target time period when the set of resources is requested; the allocation function; and a deadline to claim an allocation from the communication server.

In some scenarios, some malicious vehicles may broadcast a bogus notification message with a purpose to manipulate an amount of resources in the vehicular micro cloud. In order to prevent the bogus notification message from affecting the resource usage in the vehicular micro cloud, the notification module 204 signs the notification message using a private key of the communication server to generate a signature of the notification message so that the notification message further includes the signature. In this case, the signed notification message may be broadcasted inside the vehicular micro cloud or outside the vehicular micro cloud over a V2X network later, and any vehicle that receives the signed notification message can verify the signature of the communication server using a public key of the communication server (the public key is accessible by every vehicle). By verifying the notification message using the signature of the communication server, any vehicle that receives the notification message can ensure that the received notification message is actually created by the communication server and is not tempered.

The first operation module 206 can be software including routines that, when executed by the processor 125, cause the processor 125 to modify an operation of the communication unit 145 to transmit or receive data via the communication unit 145. In some embodiments, the first operation module 206 can be a set of instructions stored in the memory 127 of the computer system 200 and can be accessible and executable by the processor 125. The first operation module 206 may be adapted for cooperation and communication with the processor 125 and other components of the computer system 200 via a signal line 249.

In some embodiments, the first operation module 206 modifies an operation of the communication unit 145 of the vehicle 110 to distribute the notification message in the vehicular micro cloud. For example, the first operation module 206 modifies an operation element of the communication unit 145 of the vehicle 110 to transmit the notification message to one or more members of the vehicular micro cloud, causing the one or more members of the vehicular micro cloud to relay the notification message to one or more other members of the vehicular micro cloud, one or more non-member vehicles in the roadway environment or a combination thereof.

In some embodiments, an operation element of the communication unit 145 includes one or more of the following: one or more active V2X channels to be operated on the communication unit 145; one or more active V2X radios to be operated on the communication unit 145; one or more active V2X antennas to be operated on the communication unit 145; one or more operating frequencies of the one or more active V2X channels; one or more beamforming techniques performed on the one or more active V2X antennas; and a bandwidth allocation scheme of the communication unit 145.

For example, when distributing the notification message in the vehicular micro cloud, the first operation module 206 can modify one or more of the following operation elements of the communication unit 145: (1) increasing the number of active V2X channels so that more V2X channels can be used to communicate with nearby vehicles simultaneously; (2) changing a beamforming technique applied on one or more V2X antennas so that a signal transmitted to a nearby vehicle with a farther distance may have a higher signal strength; and (3) allocating more bandwidth to the communication unit 145 so that data can be exchanged with other nearby vehicles with a faster speed. In this way, communication efficiency in the vehicular micro cloud can be improved.

In some embodiments, the first operation module 206 modifies the operation of the communication unit 145 of the vehicle 110 to receive one or more resource provisioning logs (e.g., each including a proof of validity) associated with the notification message from the one or more host vehicles. For example, the first operation module 206 modifies an operation element of the communication unit 145 of the vehicle 110 to receive the one or more resource provisioning logs from the one or more host vehicles, where each of the one or more host vehicles provisions at least a resource requested by the notification message to the vehicular micro cloud during a target time period. The one or more host vehicles include: at least a member of the vehicular micro cloud; at least a non-member vehicle in the roadway environment; or a combination thereof.

The allocation module 208 can be software including routines that, when executed by the processor 125, cause the processor 125 to provide allocations to host vehicles. In some embodiments, the allocation module 208 can be a set of instructions stored in the memory 127 of the computer system 200 and can be accessible and executable by the processor 125. The allocation module 208 may be adapted for cooperation and communication with the processor 125 and other components of the computer system 200 via a signal line 228.

As described above, an allocation provided to a respective host vehicle may cause a modification of one or more parameters that are allocated to the host vehicle so that performance or operation of the host vehicle is improved based on the modification of the one or more parameters. Similar description is not repeated here.

In some embodiments, one or more resource provisioning logs in response to the notification message are received from one or more host vehicles, and the allocation module 208 provides one or more allocations to the one or more host vehicles based on the notification message and the one or more resource provisioning logs. For example, the one or more host vehicles submit the one or more resource provisioning logs to the communication server by a designated deadline specified in the notification message, where the submission can be performed anytime between a time when the resource is provisioned and the designated deadline. When the designated deadline is reached, the allocation module 208 calculates a total amount of resources "s" supplied in the vehicular micro cloud during a corresponding target time period by aggregating the one or more resource provisioning logs. The allocation module 208 calculates and assigns one or more allocations to the one or more host vehicles based on the allocation function specified by the notification message and the total amount of resources "s" supplied in the vehicular micro cloud.

Specifically, at first the allocation module 208 verifies the one or more resource provisioning logs based on one or more proofs of validity attached to the one or more resource provisioning logs respectively to determine a set of verified resource provisioning logs. A verified resource provisioning log can be a resource provisioning log whose proof of validity is verified.

For example, each host vehicle can submit a verifiable proof of validity, along with a respective resource provisioning log. The proof of validity is generated on the host vehicle by using a Trusted Platform Module (TPM) hardware (e.g., a chip dedicated for security) which is installed in an onboard computer of the host vehicle. The TPM hardware measures each piece of code that runs during booting, and each measurement is recorded in a Platform Configuration Register (PCR) by the TPM hardware such that the value of the PCR is loaded with a hash of its current value concatenated with the new measurement. The proof of validity is generated by signing a combination of the respective resource provisioning log of the host vehicle and the PCR with a private key of the TPM hardware (e.g., the proof of validity=a signature of <resource provisioning log of the host vehicle, PCR>, which is signed by the private key of the TPM hardware). The communication server keeps a public key of the TPM hardware, and thus can verify this signature. By checking that the PCR value matches a known value for a trusted configuration, the allocation module 208 can verify that an onboard computer's system software of the host vehicle is in a trusted state and the respective resource provisioning log is not tampered.

Next, the allocation module 208 determines a total amount of one or more resources actually supplied in the vehicular micro cloud based on the set of verified resource provisioning logs. For example, the allocation module 208 calculates the total amount of the one or more resources actually supplied in the vehicular micro cloud as a sum of the amounts of the one or more resources indicated by the set of verified resource provisioning logs.

Then, the allocation module 208 determines a set of allocations associated with the set of verified resource provisioning logs based on: (1) the allocation function; and (2) the total amount of the one or more resources actually supplied in the vehicular micro cloud. The allocation module 208 provides the set of allocations to a set of host vehicles whose proofs of validity are verified (e.g., the set of host vehicles generates the set of verified resource provisioning logs respectively).

In some embodiments, the set of allocations provided to the set of host vehicles is equal to one another. In some other embodiments, the set of allocations provided to the set of host vehicles is different from one another, and the allocation module 208 determines a specific allocation for a particular host vehicle further based on an amount of the resources provisioned by the particular host vehicle. For example, a host vehicle that provisions more resources to the vehicular micro cloud may receive a higher allocation.

Figure 2B:
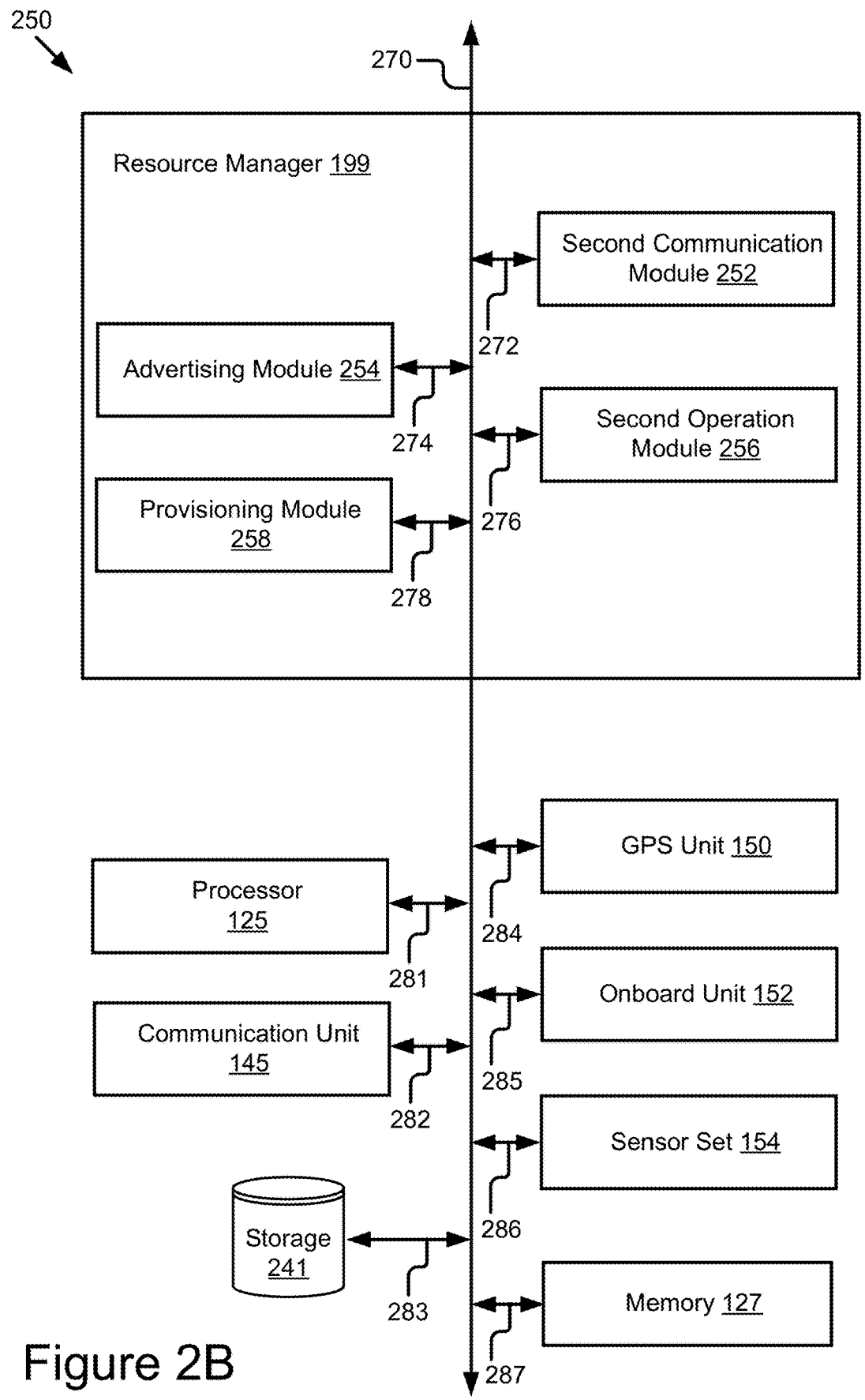
FIG. 2B is a block diagram illustrating an example computer system including a resource manager on a side of a host vehicle according to some embodiments.

Referring now to FIG. 2B, depicted is a block diagram illustrating an example computer system 250 including the resource manager 199 installed in a host vehicle according to some embodiments. In some embodiments, the computer system 250 may include a special-purpose computer system that is programmed to perform one or more steps of methods 600, 700 and 800 described below with reference to FIGS. 6-8B.

The host vehicle is a member of the vehicular micro cloud that includes a set of connected vehicles that share their computing resources and computing services with one another. Assume that the host vehicle installed with the resource manager 199 is the vehicle 110 by way of examples. The computer system 250 is an on-board vehicle computer of the vehicle 110, an onboard unit of the vehicle 110, an electronic control unit (ECU), head unit or some other processor-based computing device of the vehicle 110.

The computer system 250 may include one or more of the following elements according to some examples: the resource manager 199; the processor 125; the memory 127; the communication unit 145; the GPS unit 150; the onboard unit 152; the sensor set 154; and the storage 241. The components of the computer system 250 are communicatively coupled by a bus 270.

In the illustrated embodiment, the processor 125 is communicatively coupled to the bus 270 via a signal line 281. The communication unit 145 is communicatively coupled to the bus 270 via a signal line 282. The GPS unit 150 is communicatively coupled to the bus 270 via a signal line 284. The onboard unit 152 is communicatively coupled to the bus 270 via a signal line 285. The sensor set 154 is communicatively coupled to the bus 270 via a signal line 286. The storage 241 is communicatively coupled to the bus 270 via a signal line 283. The memory 127 is communicatively coupled to the bus 270 via a signal line 287.

The processor 125, the memory 127, the communication unit 145, the GPS unit 150, the onboard unit 152 and the sensor set 154 are described above with reference to FIG. 1B. The storage 241 is described above with reference to FIG. 2A. Similar description will not be repeated here. The memory 127 may store any of the data described above with reference to FIGS. 1B-1E. The memory 127 may store any data necessary for the computer system 250 to provide its functionality.

In the illustrated embodiment shown in FIG. 2B, the resource manager 199 includes: a second communication module 252; an advertising module 254; a second operation module 256; and a provisioning module 258. These components of the resource manager 199 are communicatively coupled to each other via the bus 270. In some embodiments, components of the resource manager 199 can be stored in a single device. In some other embodiments, components of the resource manager 199 can be distributed and stored across multiple devices.

The second communication module 252 can be software including routines for handling communications between the resource manager 199 and other components of the computer system 250. In some embodiments, the second communication module 252 can be stored in the memory 127 of the computer system 250 and can be accessible and executable by the processor 125. The second communication module 252 may be adapted for cooperation and communication with the processor 125 and other components of the computer system 250 via a signal line 272.

The second communication module 252 sends and receives data, via the communication unit 145, to and from one or more elements of the operating environment 100. For example, the second communication module 252 receives or transmits, via the communication unit 145, one or more of the following elements: notification messages; and resource provisioning logs. The second communication module 252 may send or receive any of the data or messages described above with reference to FIGS. 1B-1E via the communication unit 145.

In some embodiments, the second communication module 252 receives data from components of the resource manager 199 and stores the data in one or more of the storage 241 and the memory 127. For example, the second communication module 252 receives data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 250).

In some embodiments, the second communication module 252 may handle communications between components of the resource manager 199. For example, the second communication module 252 may handle communications among the advertising module 254, the second operation module 256 and the provisioning module 258. Any of these systems or modules may cause the second communication module 252 to communicate with the other elements of the computer system 250 or the operating environment 100 (via the communication unit 145).

In some embodiments, the advertising module 254 can be software including routines for advertising a notification message in a vehicular micro cloud. In some embodiments, the advertising module 254 can be a set of instructions stored in the memory 127 of the computer system 250 and can be accessible and executable by the processor 125. The advertising module 254 may be adapted for cooperation and communication with the processor 125 and other components of the computer system 250 via a signal line 274.

In some embodiments, the advertising module 254 verifies a notification message received from the communication server by checking a signature of the communication server included in the notification message. Responsive to the notification message being verified, the advertising module 254 advertises the notification message within the vehicular micro cloud, outside the vehicular micro cloud or a combination thereof. For example, the advertising module 254 forwards the notification message to other members of the vehicular micro cloud, non-member vehicles in the roadway environment or a combination thereof to invite more vehicles to provision one or more resources requested in the notification message to the vehicular micro cloud.

On the other hand, responsive to the notification message being not verified, the advertising module 254 discards the notification message. In this case, the resource manager 199 of the host vehicle may not take any further actions with respect to the notification message.

The second operation module 256 can be software including routines that, when executed by the processor 125, cause the processor 125 to modify an operation of the communication unit 145 to transmit or receive data via the communication unit 145. In some embodiments, the second operation module 256 can be a set of instructions stored in the memory 127 of the computer system 250 and can be accessible and executable by the processor 125. The second operation module 256 may be adapted for cooperation and communication with the processor 125 and other components of the computer system 250 via a signal line 276.

In some embodiments, the second operation module 256 modifies an operation of the communication unit 145 of the host vehicle to receive a notification message from the communication server via a V2X communication. For example, the second operation module 256 modifies an operation element of the communication unit 145 of the host vehicle to receive the notification message from the communication server.

In some embodiments, the second operation module 256 modifies the operation of the communication unit 145 of the host vehicle to transmit a resource provisioning log (e.g., including a proof of validity) associated with the notification message to the communication server. For example, the second operation module 256 modifies an operation element of the communication unit 145 of the host vehicle to transmit the resource provisioning log to the communication server. In some embodiments, the resource provisioning log as well as the proof of validity is transmitted to the communication server within a deadline to claim an allocation from the communication server.

In some embodiments, an operation element of the communication unit 145 includes one or more of the following: one or more active V2X channels to be operated on the communication unit 145; one or more active V2X radios to be operated on the communication unit 145; one or more active V2X antennas to be operated on the communication unit 145; one or more operating frequencies of the one or more active V2X channels; one or more beamforming techniques performed on the one or more active V2X antennas; and a bandwidth allocation scheme of the communication unit 145.

For example, when transmitting the resource provisioning log to the communication server, the second operation module 256 can modify one or more of the following operation elements of the communication unit 145: (1) increasing the number of active V2X channels so that more V2X channels can be used to communicate with the communication server and nearby vehicles simultaneously; (2) changing a beamforming technique applied on one or more V2X antennas so that a signal transmitted to a nearby vehicle with a farther distance may have a higher signal strength; and (3) allocating more bandwidth to the communication unit 145 so that data can be exchanged with the communication server and other nearby vehicles with a faster speed. In this way, communication efficiency in the vehicular micro cloud can be improved.

The provisioning module 258 can be software including routines that, when executed by the processor 125, cause the processor 125 to provision at least a resource requested in the notification message to the vehicular micro cloud. In some embodiments, the provisioning module 258 can be a set of instructions stored in the memory 127 of the computer system 250 and can be accessible and executable by the processor 125. The provisioning module 258 may be adapted for cooperation and communication with the processor 125 and other components of the computer system 250 via a signal line 278.

In some embodiments, the provisioning module 258 determines an expectation of the host vehicle for provisioning at least a resource requested in the notification message to the vehicular micro cloud based on one or more expectation-determination factors. The one or more expectation-determination factors include, but are not limited to, one or more of the following: a remaining amount of the resource in an onboard computer unit of the host vehicle; energy consumption for provisioning the resource to the vehicular micro cloud; and a hardware cost of the onboard computer unit of the host vehicle.

The expectation of the host vehicle may describe an expected allocation (e.g., a type of the expected allocation, an amount of the expected allocation or a combination thereof) that the host vehicle expects to receive from the communication server in exchange for reserving at least a resource for use by any member of the vehicular micro cloud. For example, an expected allocation of the host vehicle indicates that: (1) the host vehicle would like to be allocated with additional bandwidth from the communication server for a particular period of time so that the operation of the communication unit 145 of the host vehicle is improved; and (2) an expected amount of the additional bandwidth allocated to the host vehicle may not be less than a bandwidth-allocation threshold. In another example, an expected allocation of the host vehicle indicates that the host vehicle would like to be allocated with an additional channel from the communication server for a particular period of time so that the host vehicle can transmit data to the communication server with a higher speed during that particular period of time. Other examples of the expected allocation of the host vehicle are possible.

In some embodiments, the provisioning module 258 determines whether an allocation function included in the notification message meets an expectation of the host vehicle. Specifically, the provisioning module 258 determines a suggested allocation based on the allocation function specified in the notification message, determines an expected allocation of the host vehicle for provisioning at least a resource to the vehicular micro cloud, and determines whether the suggested allocation satisfies the expected allocation. Responsive to the suggested allocation satisfying the expected allocation, the provisioning module 258 determines that the allocation function included in the notification message meets the expectation of the host vehicle.

For example, assume that the allocation function defines how to allocate additional bandwidth to host vehicles as a function of a resource provisioned to the vehicular micro cloud (e.g., for the resource "s" supplied in the vehicular micro cloud, a value of the allocation function "r(s)" represents an amount of the additional bandwidth to be allocated as a function of a total amount of the resource "s" supplied in the vehicular micro cloud). Then, the suggested allocation indicates that the communication server may allocate additional bandwidth to any host vehicle. In a first scenario, if the expected allocation of the host vehicle indicates that the host vehicle would like to be allocated with additional bandwidth from the communication server for a particular period of time (with no requirement on the amount of the additional bandwidth to be allocated), then the provisioning module 258 determines that the suggested allocation satisfies the expected allocation. In a second scenario, if the expected allocation of the host vehicle has a requirement on a minimal amount of the additional bandwidth to be allocated and a maximal value of the allocation function "r(s)" is less than the minimal amount of the additional bandwidth to be allocated, then the provisioning module 258 determines that the suggested allocation does not satisfy the expected allocation. In a third scenario, if the expected allocation of the host vehicle has a requirement on a minimal amount of the additional bandwidth to be allocated and the minimal amount of the additional bandwidth to be allocated falls within a value range of the allocation function "r(s)," then the provisioning module 258 may estimate a likelihood that a final allocation value of the allocation function "r(s)" is greater than the minimal amount of the additional bandwidth to be allocated. If the estimated likelihood is greater than or equal to a likelihood threshold, then the provisioning module 258 determines that the suggested allocation satisfies the expected allocation. If the estimated likelihood is smaller than the likelihood threshold, then the provisioning module 258 determines that the suggested allocation does not satisfy the expected allocation.

Responsive to the allocation function not meeting the expectation of the host vehicle, the provisioning module 258 discards the notification message. The resource manager 199 of the host vehicle may not take any further actions to provision any resource to the vehicular micro cloud in response to the notification message.

However, responsive to the allocation function meeting the expectation of the connected vehicle, the provisioning module 258 provisions the resource requested by the notification message to the vehicular micro cloud for use by any member of the vehicular micro cloud (e.g., any other connected vehicle that is a member of the vehicular micro cloud).

The provisioning module 258 may generate a resource provisioning log to track the resource provisioned to the vehicular micro cloud and instruct the second operation module 256 to modify an operation of the communication unit 145 to send the resource provisioning log to the communication server via a V2X communication. The resource provisioning log may describe one or more of the following: a type and an amount of the resource provisioned to the vehicular micro cloud; a time period when the resource is provisioned to the vehicular micro cloud; and a location where the resource is provisioned to the vehicular micro cloud, etc.

In some embodiments, the provisioning module 258 generates a proof of validity for the resource provisioning log and instructs the second operation module 256 to modify an operation of the communication unit 145 to send the proof of validity together with the resource provisioning log to the communication server via a V2X communication. The generation of the proof of validity is described above, and so, similar description is not repeated here.

In some embodiments, the notification message may include a set of resources to be requested in the vehicular micro cloud. The provisioning module 258 may perform operations similar to those described above to provision a resource in the set of resources to the vehicular micro cloud and receives an allocation that corresponds to the provisioned resource. Alternatively, the provisioning module 258 may perform operations similar to those described above to provision multiple resources in the set of resources to the vehicular micro cloud and receives an allocation that corresponds to the multiple provisioned resources. Similar description is not repeated here.

Example Processes

Figure 3:
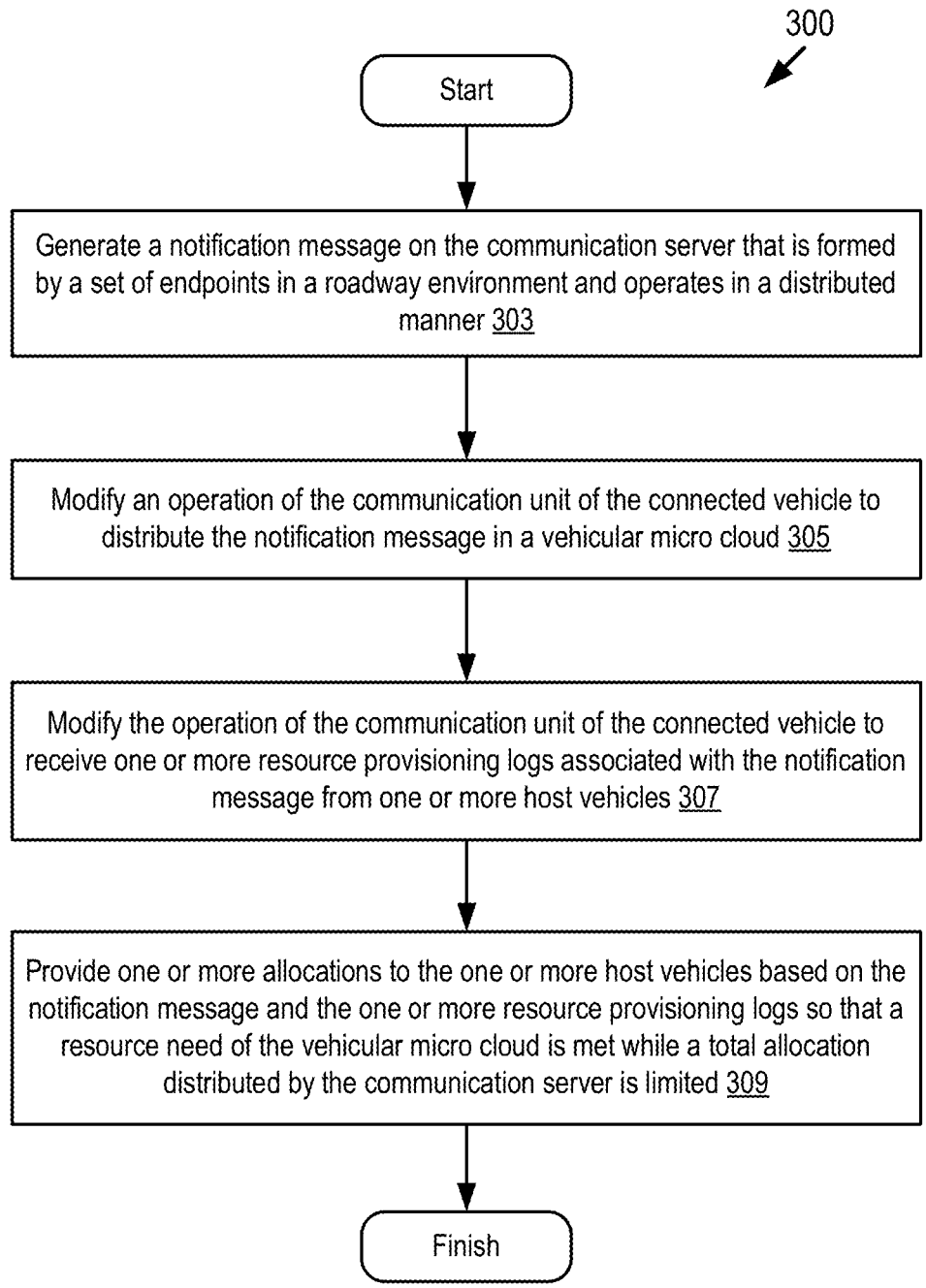
FIG. 3 depicts a method for fulfilling a resource need in a vehicular micro cloud according to some embodiments.

Referring now to FIG. 3, depicted is a flowchart of an example method 300 for fulfilling a resource need in a vehicular micro cloud according to some embodiments. The steps of the method 300 are executable in any order, and not necessarily the order depicted in FIG. 3. Here, assume that the method 300 is performed by a connected vehicle that is an endpoint from a set of endpoints that form a communication server.

At step 303, the notification module 204 generates a notification message on the communication server that is formed by a set of endpoints in a roadway environment and operates in a distributed manner.

At step 305, the first operation module 206 modifies an operation of the communication unit 145 of the connected vehicle to distribute the notification message in the vehicular micro cloud.

At step 307, the first operation module 206 modifies the operation of the communication unit 145 of the connected vehicle to receive one or more resource provisioning logs associated with the notification message from one or more host vehicles.

At step 309, the allocation module 208 provides one or more allocations to the one or more host vehicles based on the notification message and the one or more resource provisioning logs so that a resource need of the vehicular micro cloud is met while a total allocation distributed by the communication server is limited.

Figure 4:
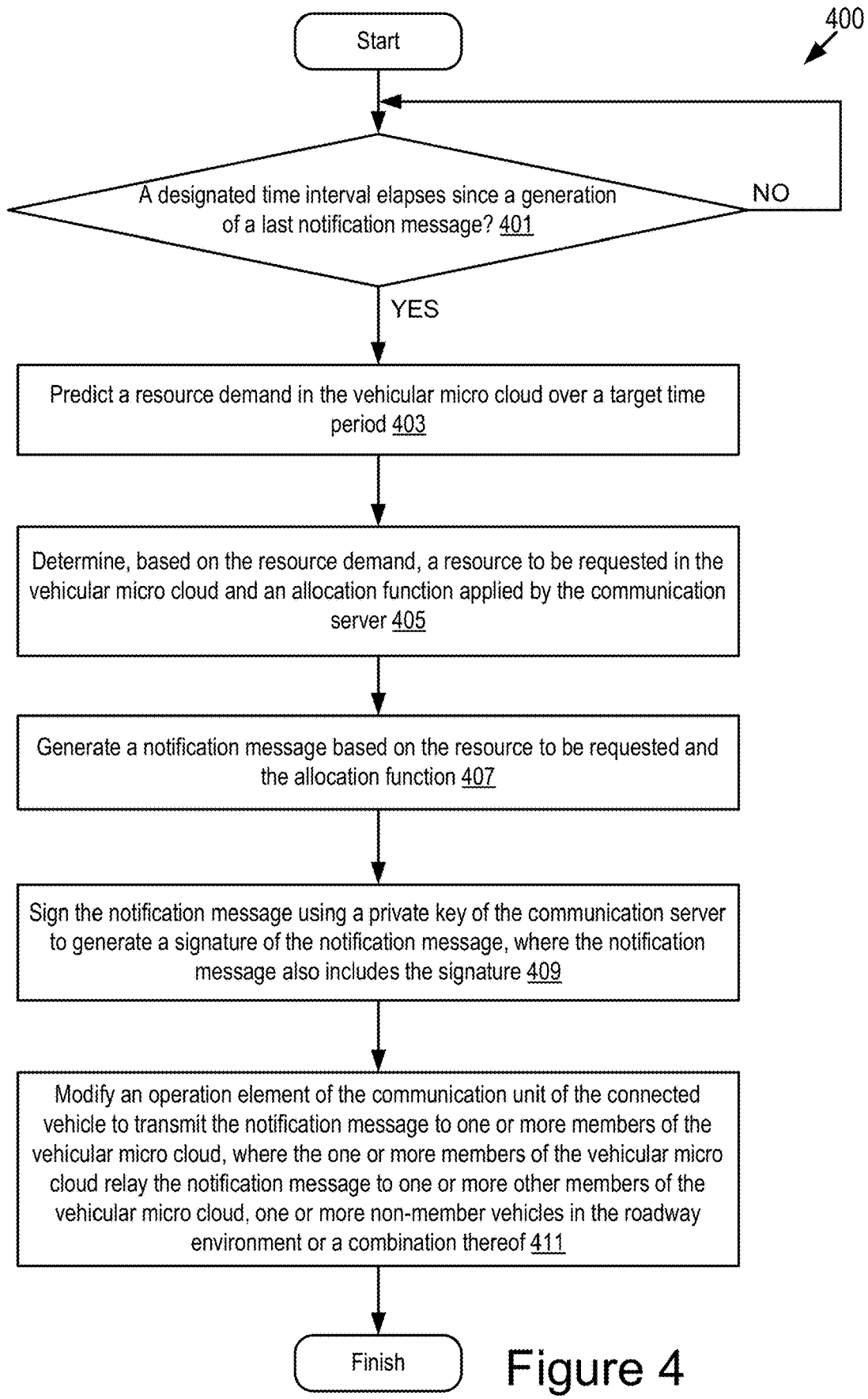
FIG. 4 depicts a method for generating a notification message according to some embodiments.

FIG. 4 depicts a method 400 for generating a notification message according to some embodiments. The steps of the method 400 are executable in any order, and not necessarily the order depicted in FIG. 4. Here, assume that the method 400 is performed by a connected vehicle that is an endpoint from a set of endpoints that form a communication server.

At step 401, the notification module 204 determines whether a designated time interval elapses since a generation of a last notification message. Responsive to that the designated time interval elapses since the generation of the last notification message, the method 400 moves to step 403. Otherwise, the method 400 remains at step 401 to monitor whether the designated time interval has elapsed.

At step 403, the notification module 204 predicts a resource demand in the vehicular micro cloud over a target time period.

At step 405, the notification module 204 determines, based on the resource demand, a resource to be requested in the vehicular micro cloud and an allocation function applied by the communication server.

At step 407, the notification module 204 generates a notification message based on the resource to be requested and the allocation function.

At step 409, the notification module 204 signs the notification message using a private key of the communication server to generate a signature of the notification message, where the notification message also includes the signature.

At step 411, the first operation module 206 modifies an operation element of the communication unit 145 of the connected vehicle to transmit the notification message to one or more members of the vehicular micro cloud, where the one or more members of the vehicular micro cloud relay the notification message to one or more other members of the vehicular micro cloud, one or more non-member vehicles in the roadway environment or a combination thereof.

Figure 5A:
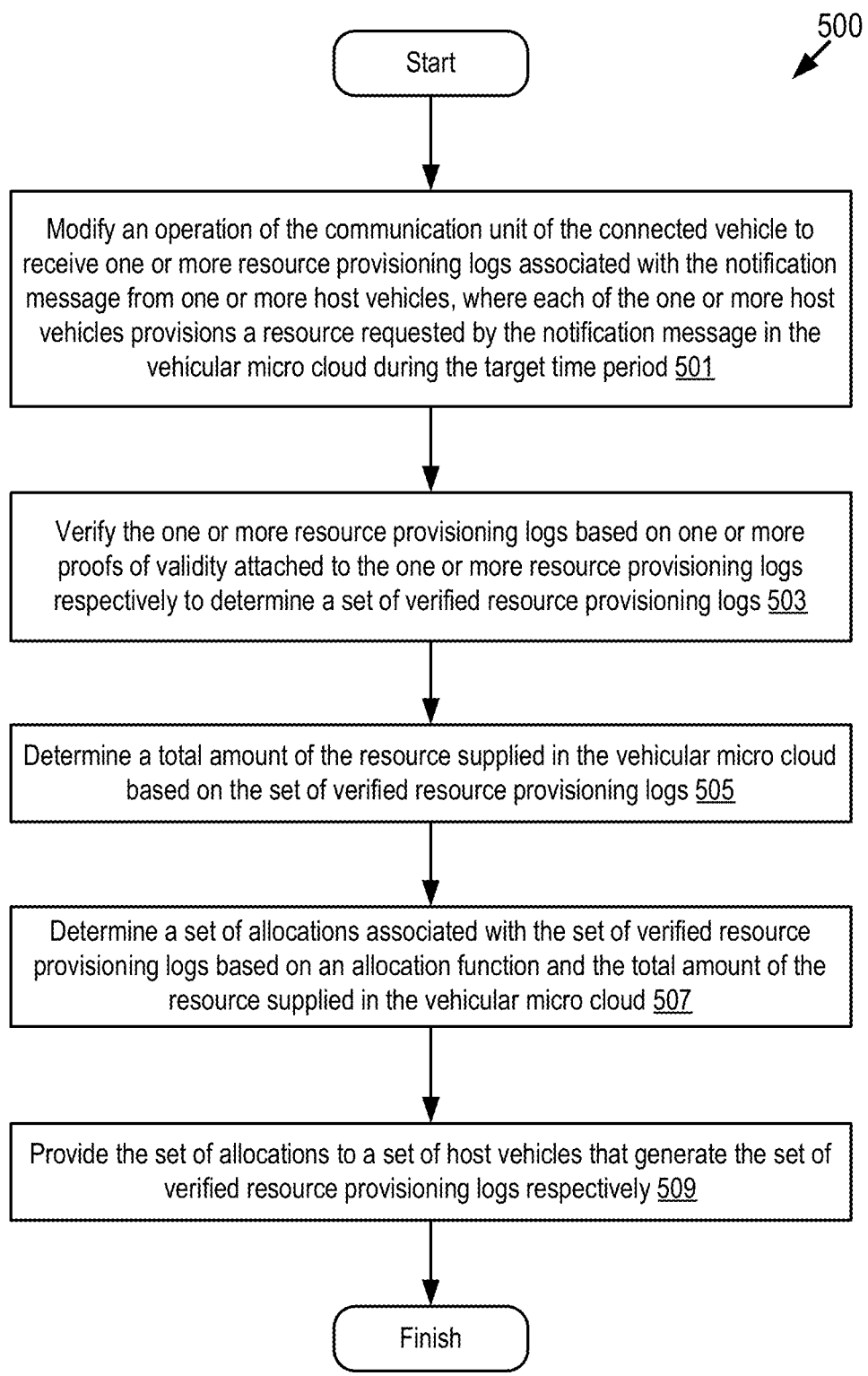
FIG. 5A depicts a method for providing allocations to host vehicles that provision resources to a vehicular micro cloud according to some embodiments.

FIG. 5A depicts a method 500 for providing allocations to host vehicles that provision resources to a vehicular micro cloud according to some embodiments. The steps of the method 500 are executable in any order, and not necessarily the order depicted in FIG. 5A. Here, assume that the method 500 is performed by a connected vehicle that is an endpoint from a set of endpoints that form a communication server.

At step 501, the first operation module 206 modifies an operation of the communication unit 145 of the connected vehicle to receive one or more resource provisioning logs associated with the notification message from one or more host vehicles, where each of the one or more host vehicles provisions a resource requested by the notification message in the vehicular micro cloud during the target time period.

At step 503, the allocation module 208 verifies the one or more resource provisioning logs based on one or more proofs of validity attached to the one or more resource provisioning logs respectively to determine a set of verified resource provisioning logs.

At step 505, the allocation module 208 determines a total amount of the resource supplied in the vehicular micro cloud based on the set of verified resource provisioning logs.

At step 507, the allocation module 208 determines a set of allocations associated with the set of verified resource provisioning logs based on an allocation function and the total amount of the resource supplied in the vehicular micro cloud.

At step 509, the allocation module 208 provides the set of allocations to a set of host vehicles that generates the set of verified resource provisioning logs respectively.

Figure 5B:
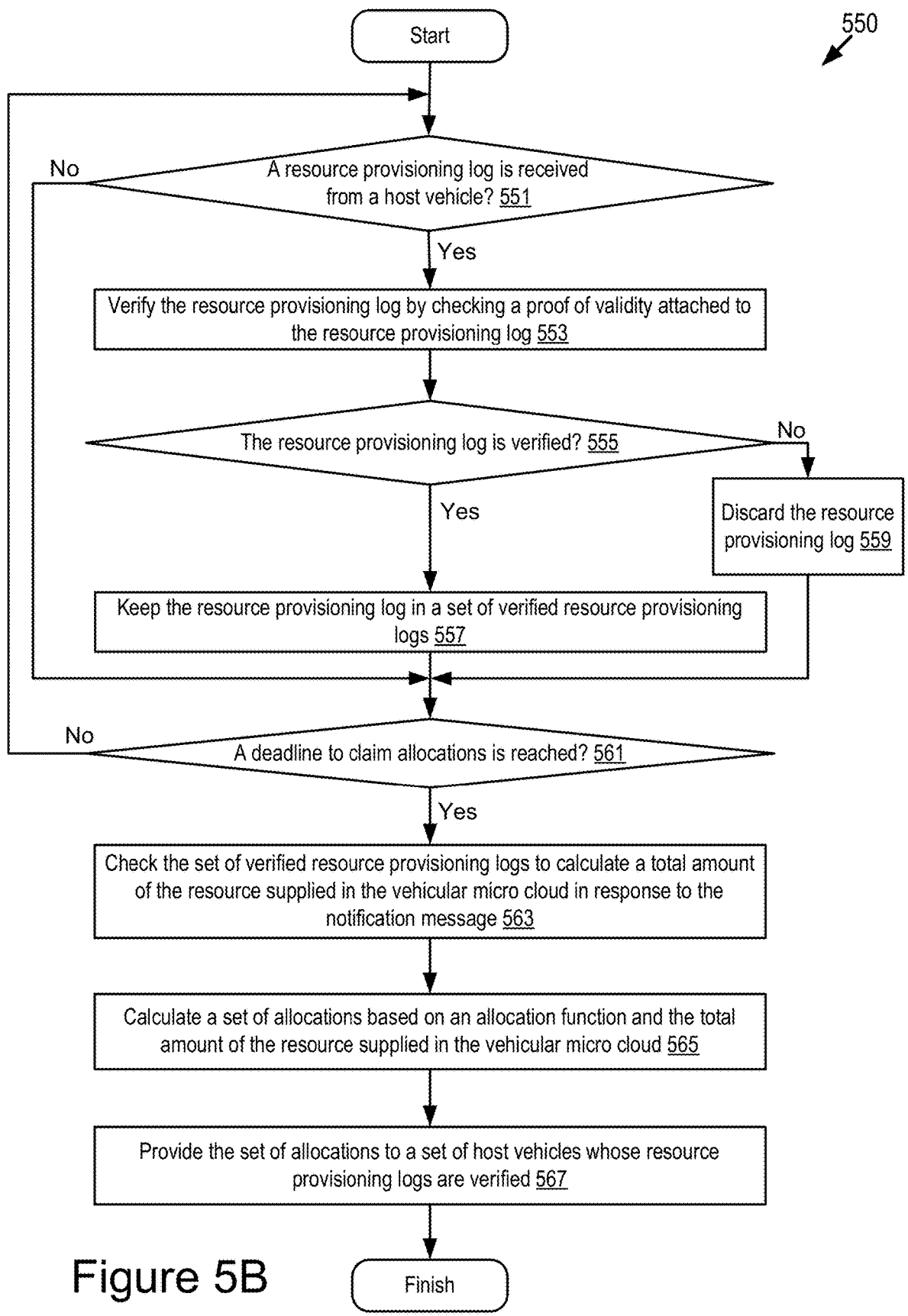
FIG. 5B depicts another method for providing allocations to host vehicles that provision resources to a vehicular micro cloud according to some embodiments.

FIG. 5B depicts another method 550 for providing allocations to host vehicles that provision resources to a vehicular micro cloud according to some embodiments. The steps of the method 550 are executable in any order, and not necessarily the order depicted in FIG. 5B. Here, assume that the method 550 is performed by a connected vehicle that is an endpoint from a set of endpoints that form a communication server.

At step 551, the allocation module 208 determines whether a resource provisioning log is received from a host vehicle. Responsive to receiving a resource provisioning log from a host vehicle, the method 550 moves to step 553. Otherwise, the method 550 moves to step 561.

At step 553, the allocation module 208 verifies the resource provisioning log by checking a proof of validity attached to the resource provisioning log.

At step 555, the allocation module 208 determines whether the resource provisioning log is verified. Responsive to the resource provisioning log being verified, the method 550 moves to step 557. Otherwise, the method 550 moves to step 559.

At step 557, the allocation module 208 keeps the resource provisioning log in a set of verified resource provisioning logs.

At step 559, the allocation module 208 discards the resource provisioning log responsive to the resource provisioning log being not verified.

At step 561, the allocation module 208 determines whether a deadline to claim allocations is reached. Responsive to the deadline being reached, the method 550 moves to step 563. Otherwise, the method 550 moves back to step 551.

At step 563, the allocation module 208 checks the set of verified resource provisioning logs to calculate a total amount of the resource supplied in the vehicular micro cloud in response to the notification message.

At step 565, the allocation module 208 calculates a set of allocations based on an allocation function and the total amount of the resource supplied in the vehicular micro cloud.

At step 567, the allocation module 208 provides the set of allocations to a set of host vehicles whose resource provisioning logs are verified.

Figure 6:
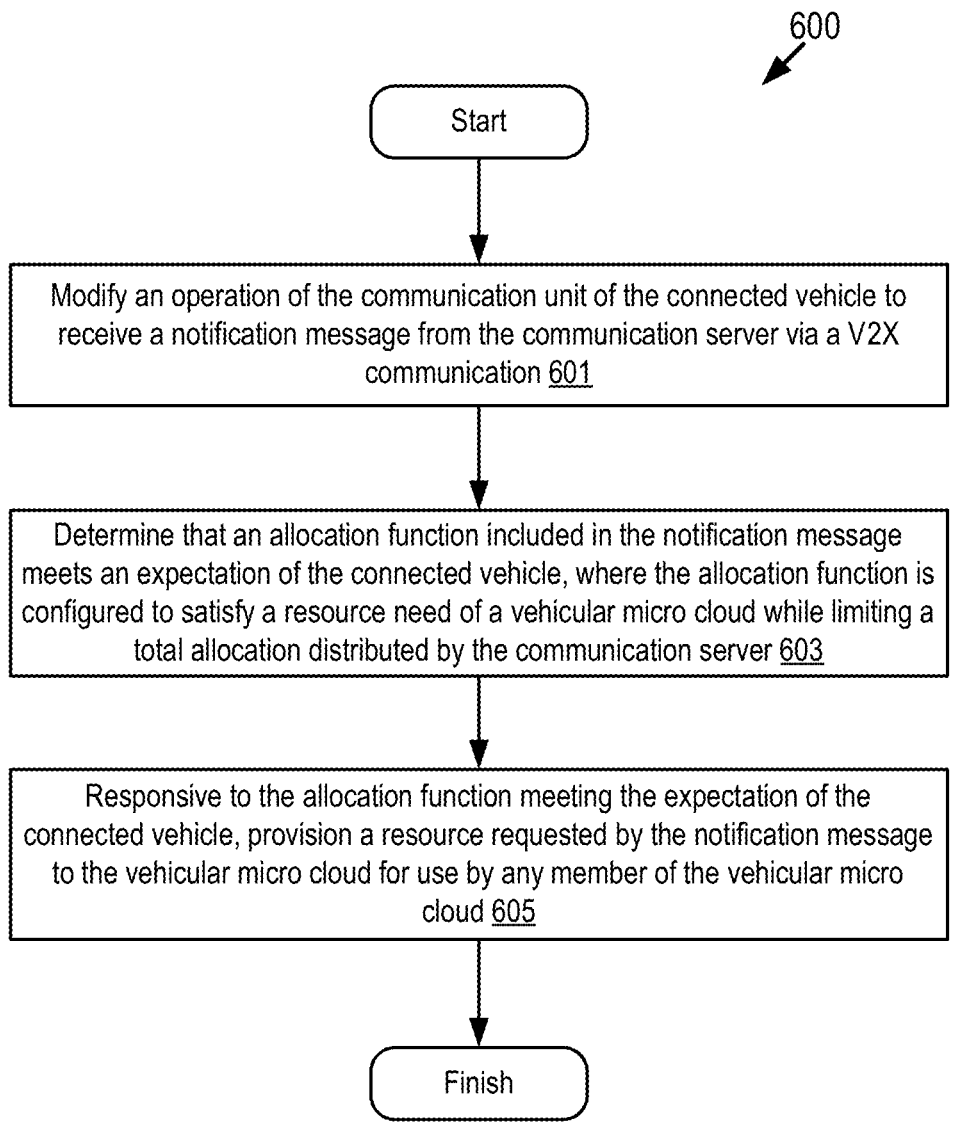
FIG. 6 depicts a method for provisioning resources to a vehicular micro cloud according to some embodiments.

FIG. 6 depicts a method 600 for provisioning resources to a vehicular micro cloud according to some embodiments. The steps of the method 600 are executable in any order, and not necessarily the order depicted in FIG. 6. Here, assume that the method 600 is performed by a connected vehicle that serves as a host vehicle for provisioning at least a resource to the vehicular micro cloud. The connected vehicle is a member of the vehicular micro cloud that includes a set of connected vehicles that share their computing resources and computing services with one another.

At step 601, the second operation module 256 modifies an operation of the communication unit 145 of the connected vehicle to receive a notification message from the communication server via a V2X communication.

At step 603, the provisioning module 258 determine that an allocation function included in the notification message meets an expectation of the connected vehicle, where the allocation function is configured to satisfy a resource need of the vehicular micro cloud while limiting a total allocation distributed by the communication server.

At step 605, responsive to the allocation function meeting the expectation of the connected vehicle, the provisioning module 258 provisions a resource requested by the notification message to the vehicular micro cloud for use by any member of the vehicular micro cloud (e.g., any connected vehicle of the vehicular micro cloud).

Figure 7A:
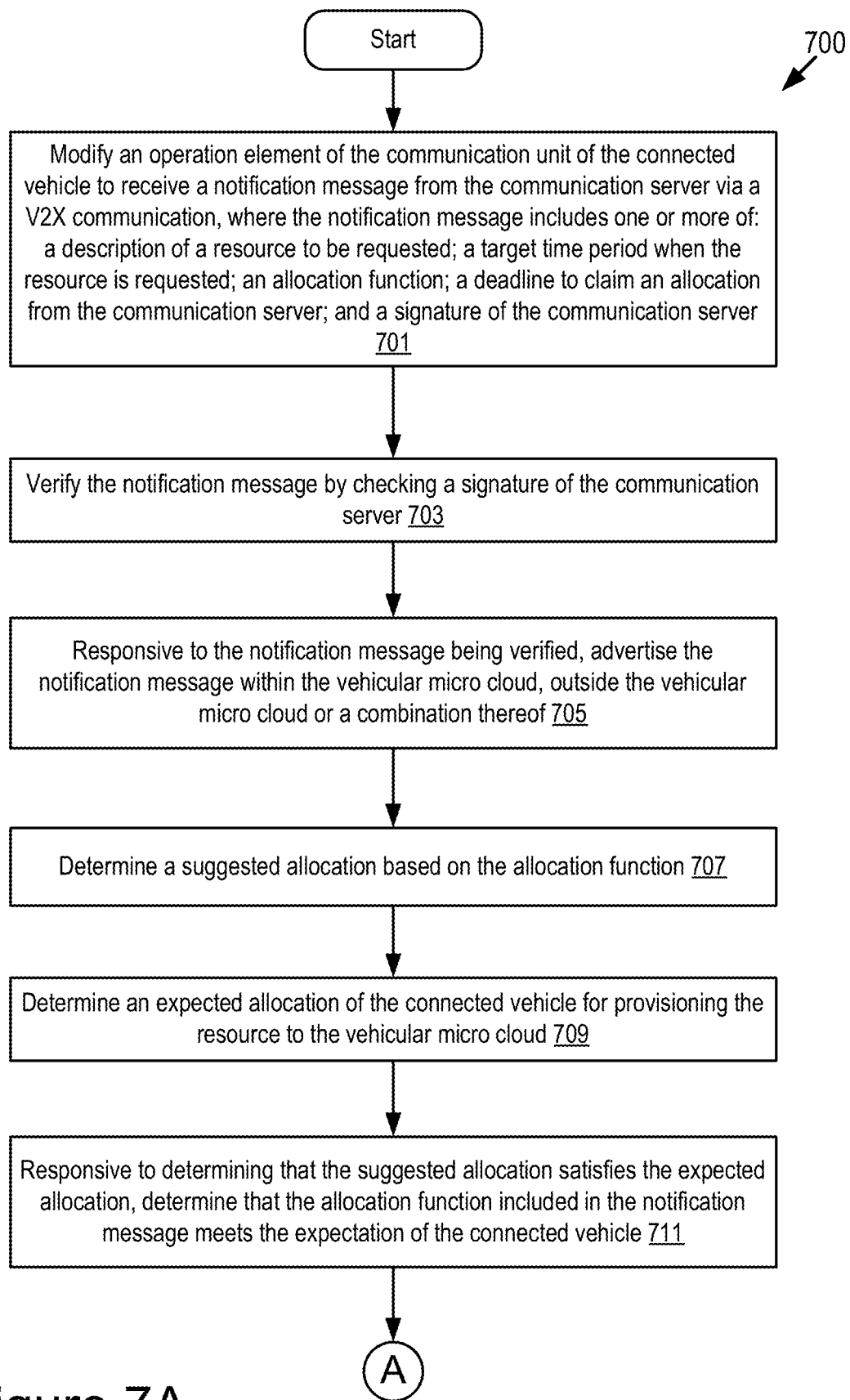
FIGS. 7A and 7B depict another method for provisioning resources to a vehicular micro cloud according to some embodiments.
Figure 7B:
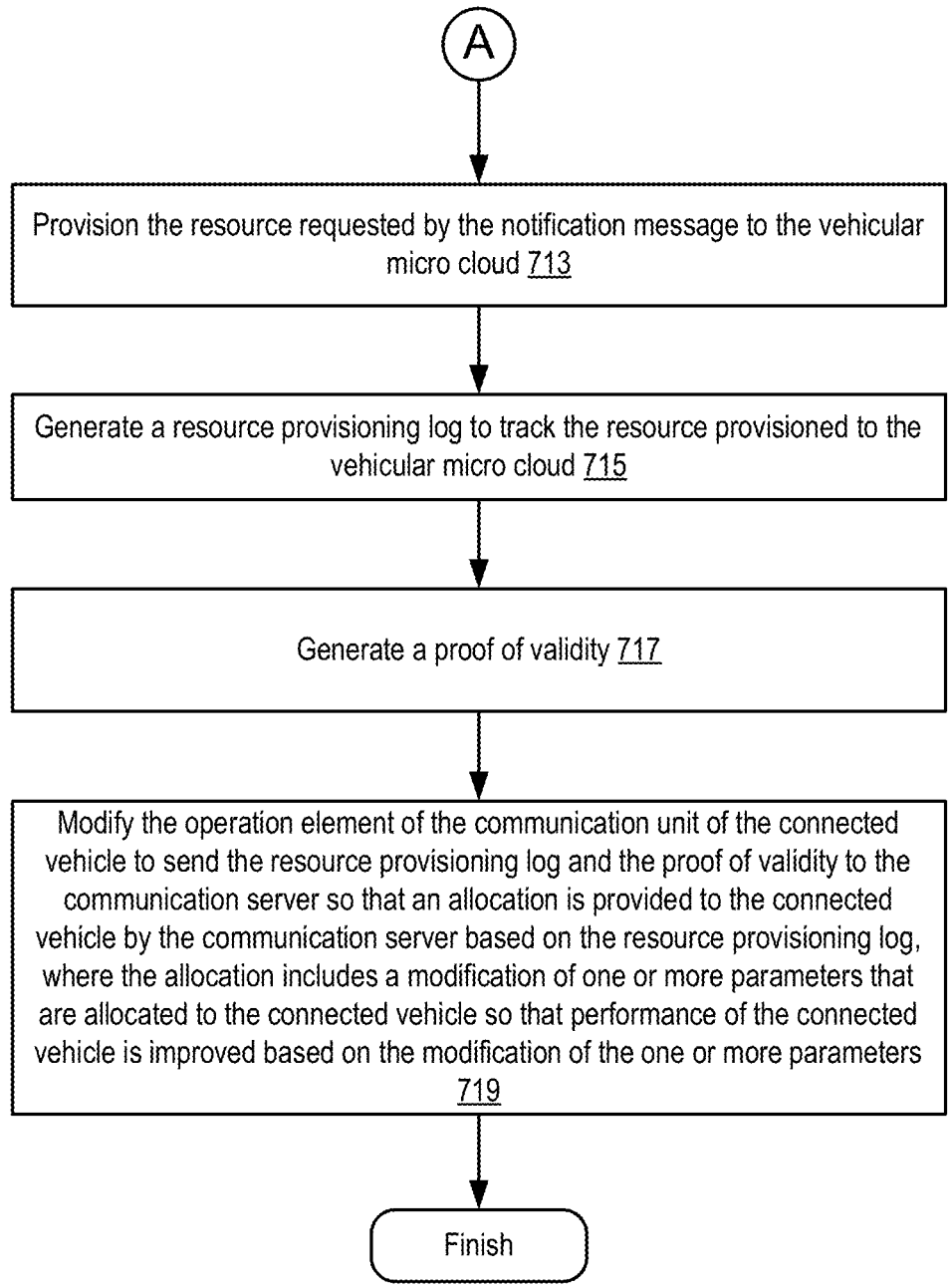

FIGS. 7A and 7B depict another method 700 for provisioning resources to a vehicular micro cloud according to some embodiments. The steps of the method 700 are executable in any order, and not necessarily the order depicted in FIGS. 7A and 7B. Here, assume that the method 700 is performed by a connected vehicle that serves as a host vehicle for provisioning at least a resource to the vehicular micro cloud.

Referring to FIG. 7A, the second operation module 256 modifies an operation element of the communication unit 145 of the connected vehicle to receive a notification message from the communication server via a V2X communication, where the notification message includes one or more of: a description of a resource to be requested; a target time period when the resource is requested; an allocation function; a deadline to claim an allocation from the communication server; and a signature of the communication server.

At step 703, the advertising module 254 verifies the notification message by checking a signature of the communication server.

At step 705, responsive to the notification message being verified, the advertising module 254 advertises the notification message within the vehicular micro cloud, outside the vehicular micro cloud or a combination thereof.

At step 707, the provisioning module 258 determines a suggested allocation based on the allocation function.

At step 709, the provisioning module 258 determines an expected allocation of the connected vehicle for provisioning the resource to the vehicular micro cloud.

At step 711, responsive to determining that the suggested allocation satisfies the expected allocation, the provisioning module 258 determines that the allocation function included in the notification message meets the expectation of the connected vehicle.

Turning to FIG. 7B, at step 713, the provisioning module 258 provisions the resource requested by the notification message to the vehicular micro cloud.

At step 715, the provisioning module 258 generates a resource provisioning log to track the resource provisioned to the vehicular micro cloud.

At step 717, the provisioning module 258 generates a proof of validity for the resource provisioning log.

At step 719, the second operation module 256 modifies the operation element of the communication unit 145 of the connected vehicle to send the resource provisioning log and the proof of validity to the communication server so that an allocation is provided to the connected vehicle by the communication server based on the resource provisioning log, where the allocation includes a modification of one or more parameters that are allocated to the connected vehicle so that performance of the connected vehicle is improved based on the modification of the one or more parameters.

Figure 8A:
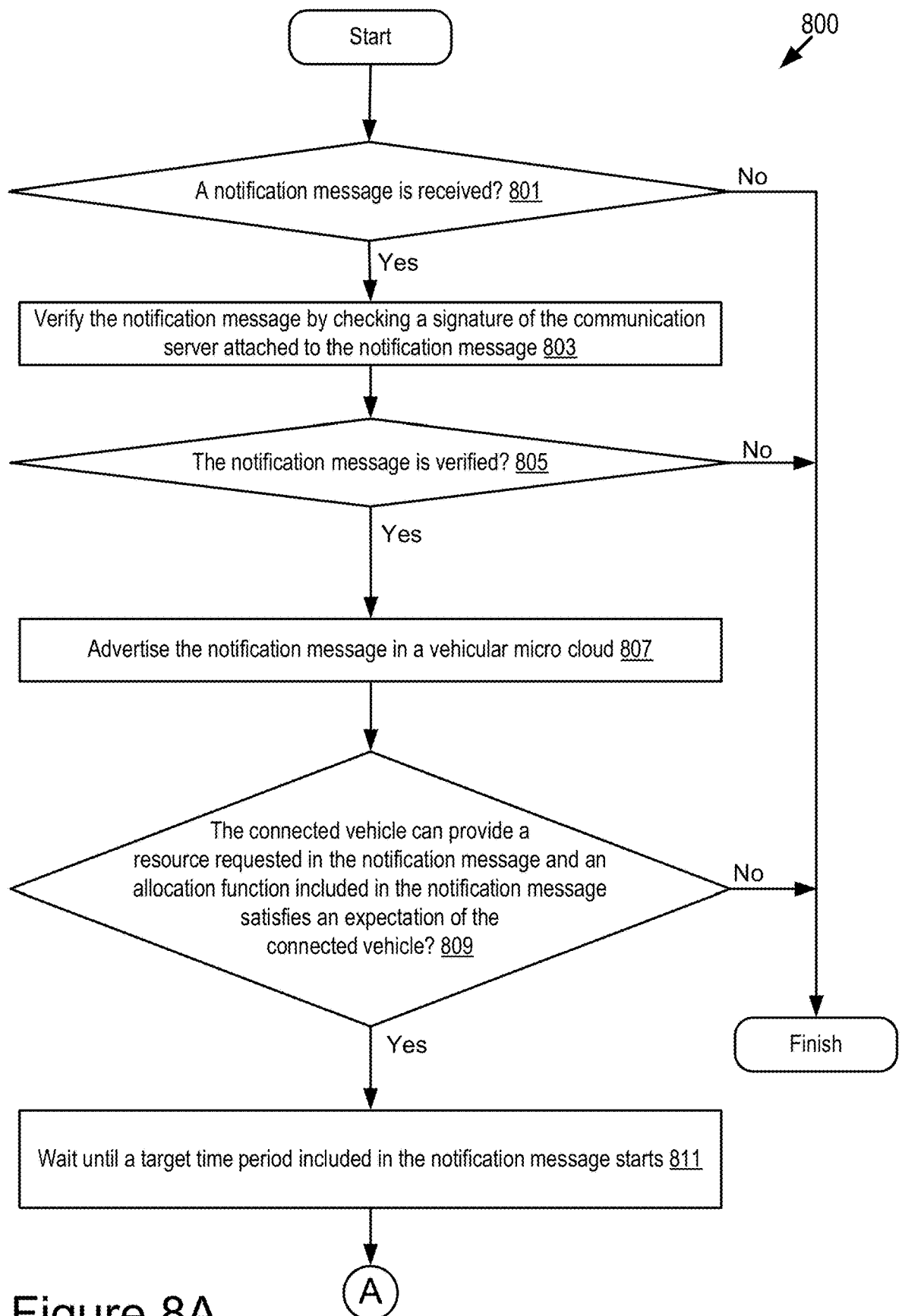
FIGS. 8A and 8B depict yet another method for provisioning resources to a vehicular micro cloud according to some embodiments.
Figure 8B:
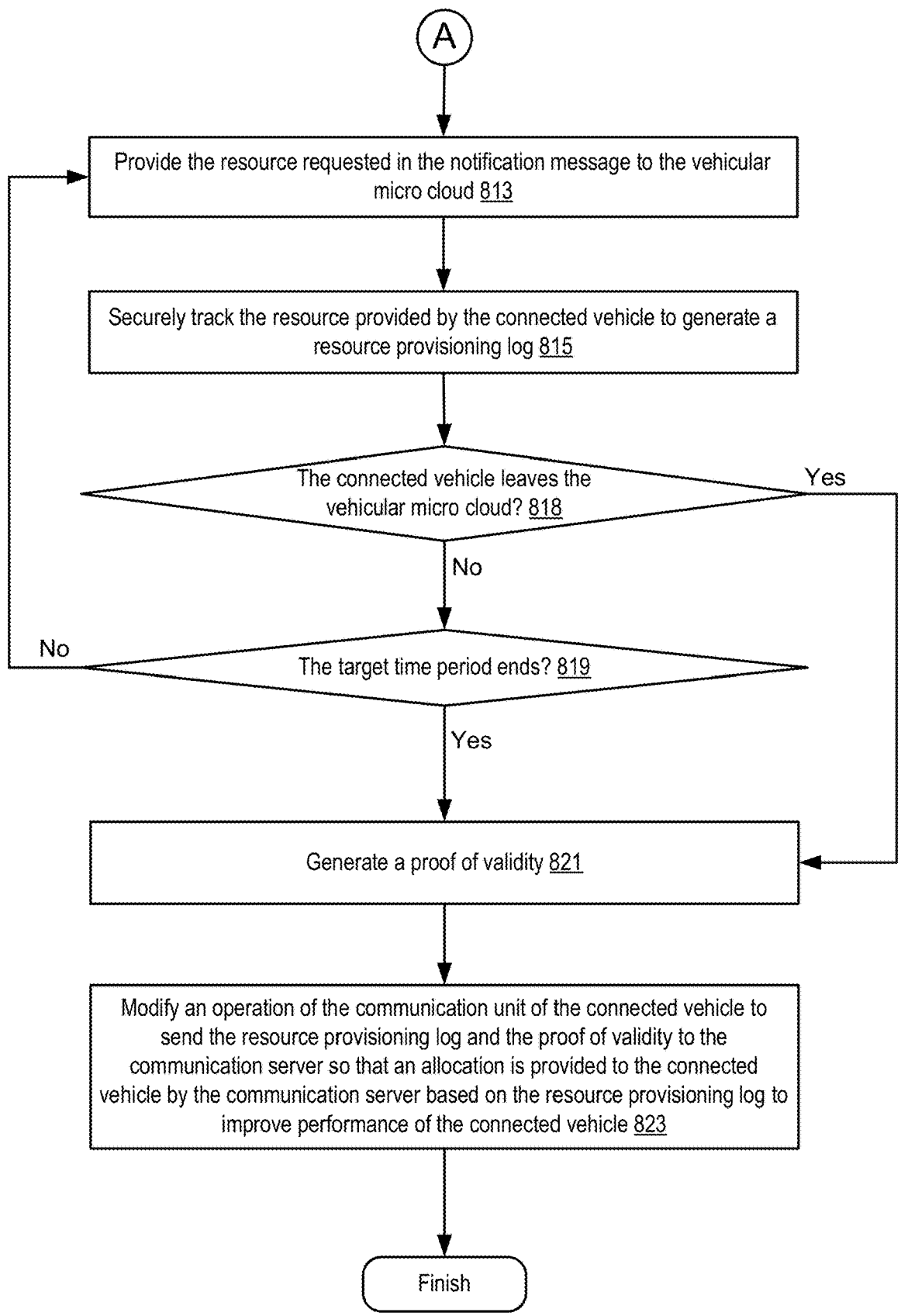

FIGS. 8A and 8B depict yet another method 800 for provisioning resources to a vehicular micro cloud according to some embodiments. The steps of the method 800 are executable in any order, and not necessarily the order depicted in FIGS. 8A and 8B. Here, assume that the method 800 is performed by a connected vehicle that serves as a host vehicle for provisioning at least a resource to the vehicular micro cloud.

Referring to FIG. 8A, the advertising module 254 determines whether a notification message is received. Responsive to that the notification message is received, the method 800 moves to step 803. Otherwise, the method 800 ends.

At step 803, the advertising module 254 verifies the notification message by checking a signature of the communication server attached to the notification message.

At step 805, the advertising module 254 determines whether the notification message is verified. Responsive to the notification message being verified, the method 800 moves to step 807. Otherwise, the method 800 ends.

At step 807, the advertising module 254 advertises the notification message in a vehicular micro cloud.

At step 809, the provisioning module 258 determines whether the connected vehicle can provide a resource requested in the notification message and an allocation function included in the notification message satisfies an expectation of the connected vehicle. Responsive to determining that the connected vehicle can provide the resource requested in the notification message and the allocation function included in the notification message satisfies the expectation of the connected vehicle, the method 800 moves to step 811. Otherwise, the method 800 ends.

At step 811, the provisioning module 258 waits until a target time period included in the notification message starts.

Turning to FIG. 8B, at step 813, the provisioning module 258 provides the resource requested in the notification message to the vehicular micro cloud.

At step 815, the provisioning module 258 securely tracks the resource provided by the connected vehicle to generate a resource provisioning log.

At step 818, the provisioning module 258 determines whether the connected vehicle leaves the vehicular micro cloud. Responsive to the connected vehicle leaving the vehicular micro cloud, the method 800 moves to step 821. Otherwise, the method 800 moves to step 819.

At step 818, the provisioning module 258 determines whether the target time period ends. Responsive to determining that the target time period ends, the method 800 moves to step 821. Otherwise, the method 800 moves to step 813.

At step 821, the provisioning module 258 generates a proof of validity for the resource provisioning log.

At step 823, the second operation module 256 modifies an operation of the communication unit 145 of the connected vehicle to send the resource provisioning log and the proof of validity to the communication server so that an allocation is provided to the connected vehicle by the communication server based on the resource provisioning log to improve performance of the connected vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a vehicle that is a member of a vehicular micro cloud that includes a set of vehicles that share their computing resources with one another, comprising:
   receiving a notification message from a communication server via a Vehicle-to-Everything (V2X) communication that includes an allocation function, wherein the allocation function describes how much of a first computing resource is received by the vehicle in exchange for reserving, from the vehicle, a total amount of a second computing resource during a target time period and wherein the allocation function satisfies a resource demand of the vehicular micro cloud while limiting a total allocation of resources distributed by the communication server;
   determining that the allocation function meets an expectation of the vehicle to receive the first computing resource; and
   responsive to the allocation function meeting the expectation of the vehicle, provisioning the second computing resource requested by the notification message to the vehicular micro cloud for use by any member of the vehicular micro cloud.

2. The method of claim 1, wherein:
   responsive to determining that the total amount of the second computing resource supplied to the vehicular micro cloud does not exceed the resource demand of the vehicular micro cloud, the allocation function is an increasing function that specifies the total amount of the second computing resource supplied in the vehicular micro cloud so that the resource demand of the vehicular micro cloud is met by causing host vehicles to provision the second computing resource to the vehicular micro cloud.

3. The method of claim 1, wherein:
   responsive to determining that the total amount of the second computing resource supplied to the vehicular micro cloud exceeds the resource demand, the allocation function is a decreasing function that specifies the total amount of the second computing resource supplied in the vehicular micro cloud so that the total allocation distributed by the communication server is limited.

4. The method of claim 1, wherein the allocation function is a non-increasing function of the total amount of the second computing resource supplied to the vehicular micro cloud.

5. The method of claim 1, further comprising:
modifying an operation element of a communication unit to receive the notification message from the communication server via the V2X communication,
wherein the notification message includes one or more of the following: a description of the second computing resource to be requested; the allocation function; or a deadline to claim an allocation from the communication server.

6. The method of claim 1, wherein determining that the allocation function included in the notification message meets the expectation of the vehicle comprises:
determining a suggested allocation based on the allocation function;
determining an expected allocation of the vehicle for provisioning the second computing resource to the vehicular micro cloud; and
responsive to the suggested allocation satisfying the expected allocation, determining that the allocation function included in the notification message meets the expectation of the vehicle.

7. The method of claim 6, wherein the expected allocation of the vehicle is determined based on one or more expectation-determination factors, including one or more of the following: a remaining amount of the second computing resource in an onboard computer unit of the vehicle; energy consumption for provisioning the second computing resource to the vehicular micro cloud; or a hardware cost of the onboard computer unit of the vehicle.

8. The method of claim 1, further comprising:
generating a resource provisioning log to track the resource provisioned to the vehicular micro cloud; and
sending the resource provisioning log to the communication server so that an allocation is provided to the vehicle by the communication server based on the resource provisioning log.

9. The method of claim 8, wherein the allocation includes a modification of one or more parameters that are allocated to the vehicle so that performance of the vehicle is improved based on the modification of the one or more parameters.

10. The method of claim 1, further comprising:
verifying the notification message by checking a signature of the communication server included in the notification message; and
responsive to the notification message being verified, advertising the notification message within the vehicular micro cloud, outside the vehicular micro cloud or a combination thereof.

11. The method of claim 8, further comprising:
generating a proof of validity for the resource provisioning log; and
sending the proof of validity together with the resource provisioning log to the communication server via the V2X communication.

12. A system for a vehicle that is a member of a vehicular micro cloud, comprising:
a processor; and
a non-transitory memory storing computer code which, when executed by the processor, causes the processor to:
receive a notification message from a communication server via a Vehicle-to-Everything (V2X) communication that includes an allocation function, wherein the allocation function describes how much of a first computing resource is received by the vehicle in exchange for reserving, from the vehicle, a total amount of a second computing resource during a target time period and wherein the allocation function satisfies a resource demand of the vehicular micro cloud while limiting a total allocation of resources distributed by the communication server;
determine that the allocation function meets an expectation of the vehicle to receive the first computing resource; and
responsive to the allocation function meeting the expectation of the vehicle, provision the second computing resource requested by the notification message to the vehicular micro cloud for use by any member of the vehicular micro cloud.

13. The system of claim 12, wherein:
responsive to determining that the total amount of the second computing resource supplied to the vehicular micro cloud does not exceed the resource demand of the vehicular micro cloud, the allocation function is an increasing function that specifies the total amount of the second computing resource supplied in the vehicular micro cloud so that the resource demand of the vehicular micro cloud is met by causing host vehicles to provision the second computing resource to the vehicular micro cloud.

14. The system of claim 13, wherein:
responsive to determining that the total amount of the second computing resource supplied to the vehicular micro cloud exceeds the resource demand, the allocation function is a decreasing function that specifies the total amount of the second computing resource supplied in the vehicular micro cloud so that the total allocation distributed by the communication server is limited.

15. The system of claim 12, wherein the allocation function is a non-increasing function of the total amount of the second computing resource supplied to the vehicular micro cloud.

16. The system of claim 12, wherein the computer code, when executed by the processor, causes the processor to determine that the allocation function included in the notification message meets the expectation of the vehicle at least by:
determining a suggested allocation based on the allocation function;
determining an expected allocation of the vehicle for provisioning the second computing resource to the vehicular micro cloud; and
responsive to the suggested allocation satisfying the expected allocation, determining that the allocation function included in the notification message meets the expectation of the vehicle.

17. A computer program product comprising a non-transitory memory included in a vehicle that is a member of a vehicular micro cloud, the non-transitory memory storing computer-executable code that, when executed by a processor, causes the processor to:
receive a notification message from a communication server via a Vehicle-to-Everything (V2X) communication that includes an allocation function, wherein the allocation function describes how much of a first computing resource is received by the vehicle in exchange for reserving, from the vehicle, a total amount of a second computing resource during a target time period and wherein the allocation function satisfies a resource demand of the vehicular micro cloud while limiting a total allocation of resources distributed by the communication server;

determine that the allocation function meets an expectation of the vehicle to receive the first computing resource; and responsive to the allocation function meeting the expectation of the vehicle, provision the second computing resource requested by the notification message to the vehicular micro cloud for use by any member of the vehicular micro cloud.

18. The computer program product of claim 17, wherein:

responsive to determining that the total amount of the second computing resource supplied to the vehicular micro cloud does not exceed the resource demand of the vehicular micro cloud, the allocation function is an increasing function that specifies the total amount of the second computing resource supplied in the vehicular micro cloud so that the resource demand of the vehicular micro cloud is met by causing host vehicles to provision the second computing resource to the vehicular micro cloud.

19. The computer program product of claim 18, wherein:

responsive to determining that the total amount of the second computing resource supplied to the vehicular micro cloud exceeds the resource demand, the allocation function is a decreasing function that specifies the total amount of the second computing resource supplied in the vehicular micro cloud so that the total allocation distributed by the communication server is limited.

20. The computer program product of claim 17, wherein the allocation function is a non-increasing function of the total amount of the second computing resource supplied to the vehicular micro cloud.

* * * * *